(12) United States Patent
Prabhakar et al.

(10) Patent No.: US 10,983,919 B2
(45) Date of Patent: Apr. 20, 2021

(54) ADDRESSING CACHE SLICES IN A LAST LEVEL CACHE

(71) Applicant: NVIDIA Corp., Santa Clara, CA (US)

(72) Inventors: Prakash Bangalore Prabhakar, Santa Clara, CA (US); James M Van Dyke, Austin, TX (US); Kun Fang, San Jose, CA (US)

(73) Assignee: NVIDIA Corp., Santa Clara, CA (US)

( * ) Notice: Subject to any disclaimer, the term of this patent is extended or adjusted under 35 U.S.C. 154(b) by 113 days.

(21) Appl. No.: 16/583,012

(22) Filed: Sep. 25, 2019

(65) Prior Publication Data

US 2021/0089465 A1     Mar. 25, 2021

(51) Int. Cl.
*G06F 12/10* (2016.01)
*G06F 12/1009* (2016.01)
*G06T 1/60* (2006.01)

(52) U.S. Cl.
CPC ............ *G06F 12/1009* (2013.01); *G06T 1/60* (2013.01); *G06F 2212/657* (2013.01)

(58) Field of Classification Search
CPC .. G06F 12/1009; G06F 2212/657; G06T 1/60
See application file for complete search history.

(56) References Cited

U.S. PATENT DOCUMENTS

| | | | |
|---|---|---|---|
| 9,396,135 B2* | 7/2016 | Kavi | G06F 12/1408 |
| 10,095,621 B1* | 10/2018 | Birke | G06F 12/0877 |
| 2006/0143425 A1* | 6/2006 | Igarashi | G06F 3/067 711/173 |
| 2009/0172284 A1* | 7/2009 | Offen | G06F 12/084 711/125 |
| 2016/0283374 A1* | 9/2016 | Pal | G06F 12/084 |
| 2018/0081818 A1* | 3/2018 | Che | G06F 12/0897 |
| 2018/0157968 A1* | 6/2018 | Henry | G06F 12/08 |
| 2019/0065374 A1* | 2/2019 | Hower | G06F 12/023 |

* cited by examiner

*Primary Examiner* — Hiep T Nguyen
(74) *Attorney, Agent, or Firm* — Rowan TELS LLC

(57) ABSTRACT

An addressing scheme in systems utilizing a number of operative memory slices in a last level cache that is not evenly divisible by a number of memory channels utilizes the operative slices exposes the full last level cache bandwidth and capacity to data processing logic in a high-performance graphics system.

20 Claims, 17 Drawing Sheets

ADDRESSING CACHE SLICES IN A LAST LEVEL CACHE

BACKGROUND

A partitioned graphics memory provides several advantages. One advantage is that because conventional dynamic random-access memories (DRAMs) are manufactured in a limited number of standard sizes, a partitioned graphics memory allows an increase in the effective memory size, which improves performance. The effective memory size is the amount of memory effectively available for computation during operation of a device utilizing the memory.

A partitioned memory has a number of partitions that are each operative to independently service memory requests from a plurality of memory clients while maintaining the appearance (e.g., address space) of a unitary memory system. A unitary memory system is one in which, from the perspective of memory clients, appears as a single address space without partitioning. In a partitioned memory, a memory controller routes addresses of memory operation requests from individual clients to specific partition/sub-partition memory locations. A partition address routing module maps an address associated with a client (e.g., a read or write request) to a memory location in a partition and its associated sub-partitions. A "module" is logic with a defined set of functionality available through its interface with other components. The individual clients may be any component within a data processing system that requires access to memory to read, write, erase, or compress data. This includes other hardware components and also software components such as applications and processes.

A partitioned memory system typically includes two or more memory partitions, such as four partitions. Each partition is coupled to a memory controller by its own respective data bus. In turn, each partition may have sub-partitions, such as two sub-partitions per partition. Each sub-partition may utilize its own respective sub-bus for reading and writing memory locations in the sub-partition. Thus, in a single memory access to a partition, the memory access will be directed to one or more of the sub-partitions of the partition. Each sub-partition may, for example, contain a graphics double data rate (GDDR) dynamic random-access memory (DRAM) chip. As an illustrative example, each partition may have 64 data pins in aggregate, wherein each sub-partition has 32 data pins. This enables, for example, a 64-bit partition to be implemented as two conventional 32 bit memory chips.

Furthermore, each sub-partition may control one or more DRAM channels. For example, a DRAM channel may be 16 data pins wide and one 32 pin sub-partition may control two such DRAM channels. In another example each channel may be 128 data pins wide (High Bandwidth Memory (HBM) DRAM) and each sub-partition may control one or more of these DRAM channels.

The memory system may utilize a last level cache (LLC) to improve performance of memory operations. "Last level cache" refers to a memory used at the interface between a first chip and memory on a second chip. A last level cache need not be a "cache" in all cases, as that term is commonly understood. Rather, the last level cache is the first stop for data and values read from an off-chip memory for use on the chip comprising the last level cache. An LLC may itself be partitioned in a manner corresponding to the underlying partitioning of the main dynamic memory, with each LLC partition further organized into "slices". For example some higher-performance graphics systems utilize graphics processing units (GPUs) with two slices per LLC partition and sixteen slices per GPU overall. Other systems have four slices per LLC partition and 32 slices per GPU. Thus conventional systems utilize LLC partition and slice counts that are powers of two. This imposes a constraint on the design of memory systems utilizing level two caching and partitioned memories.

BRIEF SUMMARY

Disclosed herein are memory system designs and addressing schemes that evenly distribute memory traffic to on-chip memory slices and off-chip memory channels wherein the number of on-chip memory slices is not evenly divisible by the number of off-chip memory channels. Designs having three or five slices for every two memory channels are described, although the design and addressing techniques are applicable more generally to other non-integer ratios of on-chip slices to off-chip channels. "Non-integer" ratio refers to the situation in which the number of operative memory slices N and the number of memory channels M are not evenly divisible by one another, such that neither N/M nor M/N is an integer. "Operative memory slices" refers to memory slices available for use during operation of a device. Other non-operative memory slices may be present but disabled. This enables the design of chips in which the last level cache comprises inoperative memory slices. "Inoperative memory slice" refers to a memory slice manufactured into a memory but disabled from being used during operation, either to create a new model or version of a more general product category, or because the slice did not pass a functional test. It is desirable to use all memory channels when some slices are disabled. The addressing schemes disclosed evenly distribute the memory traffic to these slices and channels using, for example, lookup tables. The designs enable commercial viability of LLC having a number of slices per LLC partition that is not evenly divisible by the number of memory channels serviced by those slices.

Addressing schemes are disclosed that map on-chip memory slices and off-chip memory channels in a non-integer ratio while still exposing the full LLC bandwidth and capacity to memory clients, for example to a graphics processing cluster (GPC) in a high-performance graphics system. The memory may be strided by any size and there may be no holes in the address space. The schemes evenly balance memory traffic across the various slices and memory channels as would take place in a design in which the slice count and memory channel count were powers of two and/or formed an integer ratio (without remainder). The addressing schemes are transparent to memory clients including higher-level system components (e.g., graphics programs or drivers). By transparent it is meant that such higher-level components do not require any special modification to interpret and use the addressing schemes to access the underlying memory.

Although not required, the memory channels may typically be "off chip", meaning they are implemented in a different semiconductor package than the LLC cache. The addressing schemes do not require a full-crossbar switch to achieve full connectivity between the slices in the LLC and the memory channels. In other words, while a subset of the on-chip slices communicate with more than one memory channel, most of the slices communicate directly with only one particular memory channel. This reduces the average latency of reading data from memory by reducing the probability of multiple memory channels returning data to the same memory slice at the same time.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Disclosed herein are schemes for addressing a non-power-of-two (N) number of slices of a last level cache. Although described and depicted in this context in conjunction with an LLC and an off-chip memory, the addressing and routing schemes of this disclosure are more general and may be readily adapted to addressing between any two partitioned memories and are not limited to use between an LLC and off-chip memory.

The slices of the LLC are address mapped in such a way that the maximum LLC memory bandwidth possible is available to memory clients, while at the same time the off-chip memory is efficiently accessed. This is achieved without use of a full crossbar switch between the LLC and the off-chip memory. From the perspective of memory clients, the addresses within each slice of the LLC monotonically increases to form a linear address space. This desirable address pattern is implemented without increasing chip area or power consumption.

The addressing schemes evenly distribute memory traffic to memory slices in each partition of the LLC and off-chip memory channels even when the number of slices per partition is not evenly divisible (divisible without non-zero remainder) by the number of off-chip memory channels. The addressing schemes evenly map memory traffic across the operative memory slices and memory channels using, for example, lookup tables, thus improving performance. Furthermore, the addressing schemes eliminate the need for and do not utilize a full-crossbar switch between the memory slices and the memory channels.

Figure 1:
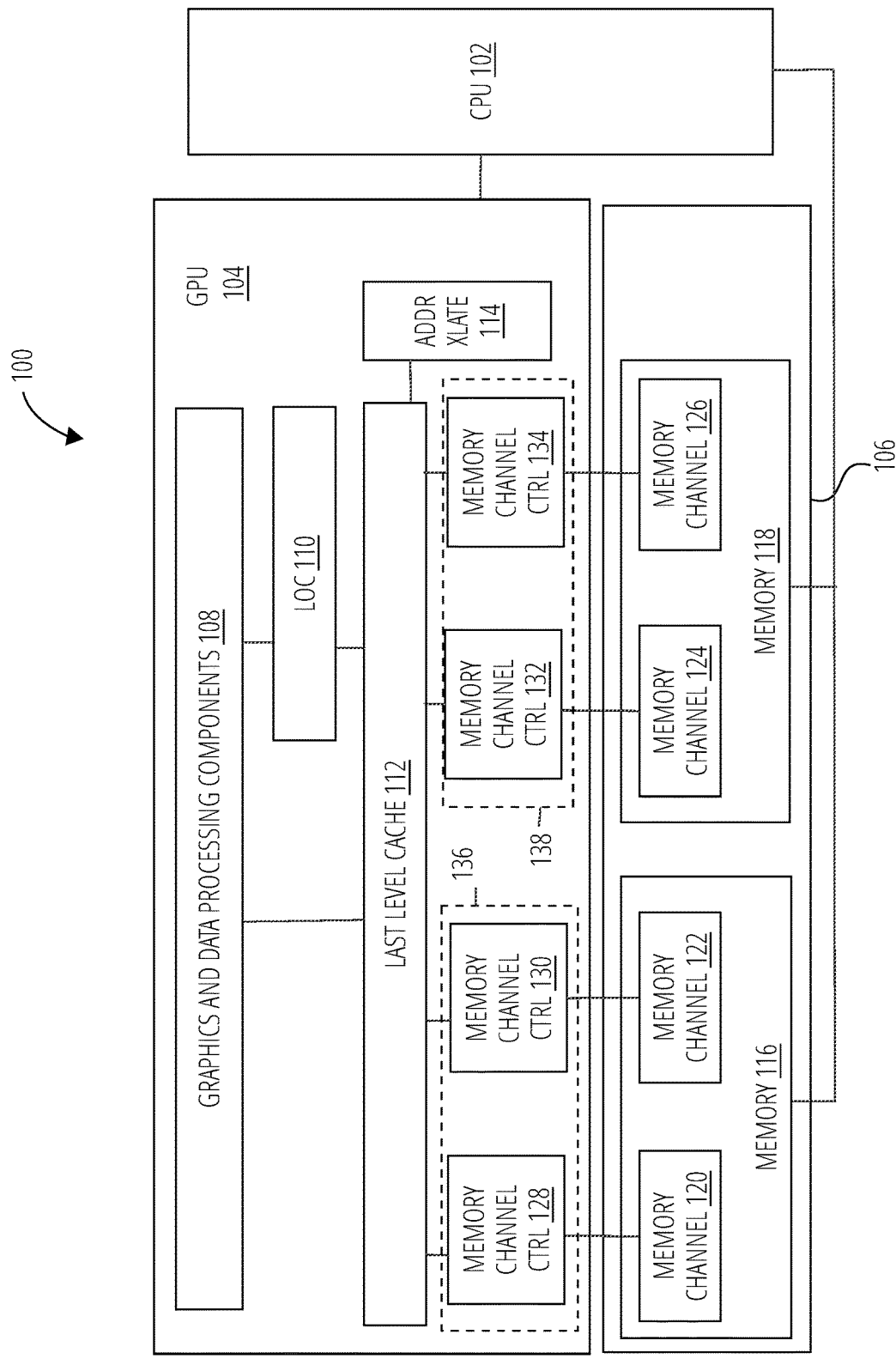
FIG. 1 depicts a data processing system 100 in accordance with one embodiment.

FIG. 1 depicts a data processing system 100 in accordance with one embodiment. The data processing system 100 comprises a central processing unit 102, a GPU 104, and a partitioned memory 106. The GPU 104 comprises various processing components 108 (graphics processing cores, arithmetic units, etc.), a level one cache 110, a set-associative last level cache 112, and address mapping logic 114. The GPU 104 of course also comprises other components known in the art and not depicted. The memory 106 comprises a first memory device 116, and a second memory device 118, in which the first memory device 116 comprises a memory channel 120 and a memory channel 122, and the second memory device 118 comprises a memory channel 124 and a memory channel 126. Here the term "memory device" refers to any device providing machine memory capacity.

Other embodiments may comprise other number of memory channels per device, for example four or eight, or numbers that are not a power of two. The memory devices may be High Bandwidth Memory (HMB), graphics double data rate (GDDR) memory, or other memory technologies. For the first memory device 116, a first memory channel controller 128 handles memory operations for the memory channel 120 and a second memory channel controller 130 handles memory operations for the memory channel 122. For the second memory device 118, a first memory channel controller 132 handles memory operations for memory channel 124 and a second memory channel controller 134 handles memory operations for the memory channel 126.

In the depicted example, the first memory channel controller 128 and second memory channel controller 130 are parts of a first frame buffer partition 136. Likewise, the first memory channel controller 132 and second memory channel controller 134 are parts of a second frame buffer partition 138. Frame buffer partitions are features of graphics memories and graphics processing systems and may not be present in other types of systems.

Figure 2:
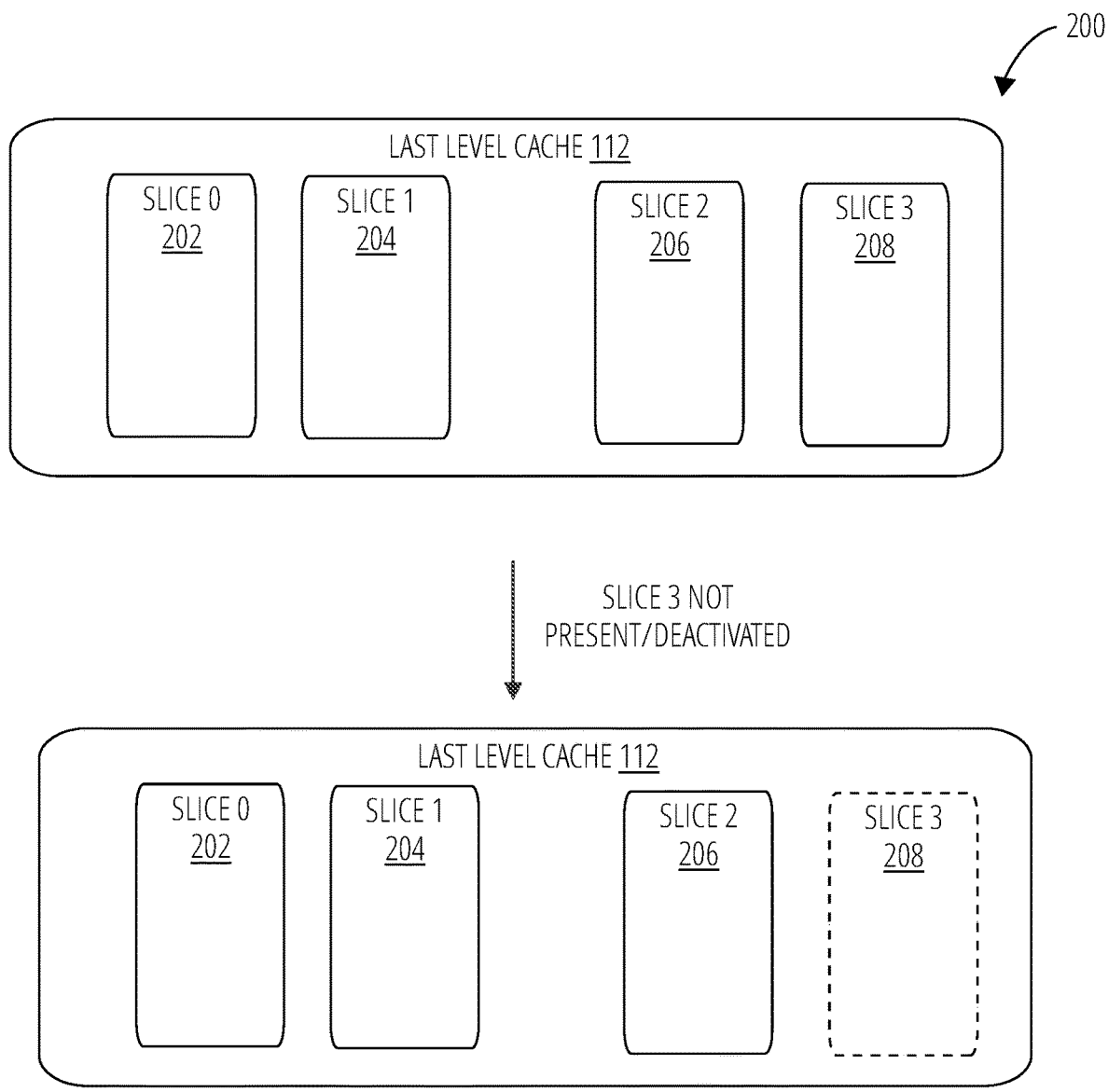
FIG. 2 depicts a non-power of two memory slice count 200 in accordance with one embodiment.

FIG. 2 depicts an embodiment of a non-power of two memory slice count 200 in the last level cache 112. Each slice of the last level cache 112 is dedicated to a particular one or more of the memory channels, meaning each slice is reserved for use by the memory channels it is dedicated to. This tends to reduce cache conflicts and improve system memory performance. In the upper diagram, four slices (cache slice 202, cache slice 204, cache slice 206, and cache slice 208) are available for use by memory clients of the data processing system 100. In the lower diagram, cache slice 208 is present in the last level cache 112 but disabled, or simply not included at all in the last level cache 112 as manufactured. The last level cache 112 of the lower diagram therefore has a number of operative memory slices that is a non-power of two.

Address Mapping (Three Slice Example)

The address mapping logic 114 performs address mapping from addresses in the last level cache 112 to physical addresses in the memory 106. The address mapping logic 114 is illustrated within the GPU 104 in this embodiment but may be implemented elsewhere or in distributed fashion within the data processing system 100, depending on the embodiment.

Figure 3:
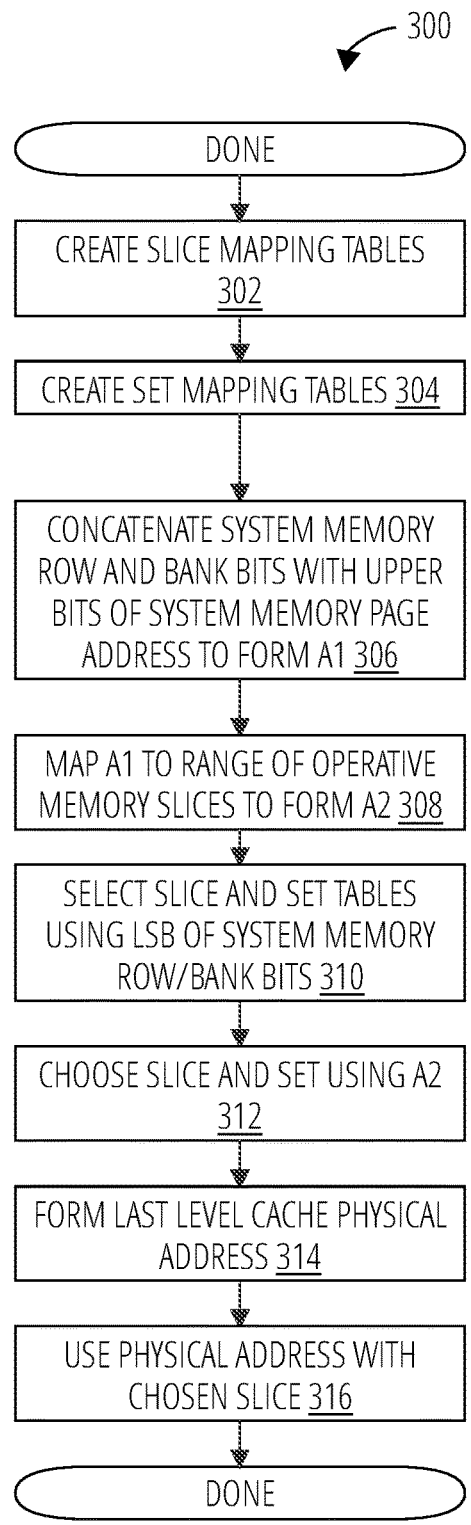
FIG. 3 depicts an address mapping process 300 in accordance with one embodiment.

At a high level, the address mapping may follow the address mapping process 300 depicted in FIG. 3. Mapping tables are created for slices of the last level cache 112 (block 302) and for sets within the slices (block 304). A value is formed from the address bits including the memory 106 row, bank, and page (block 306). This value is mapped to a range of operative memory slices (block 308), e.g., one or more slices of the LLC corresponding to a memory channel. A slice table and set table (which could be implemented as separate tables, or as a single table) are selected based on the system memory row and bank (block 310). The slice and set within the LLC are then selected (block 312) from within these tables using the mapped value from block 308. The last level cache address corresponding to the address is then determined (block 314; see below and FIG. 4 and FIG. 5 for details) and used (block 316) to access the address in the slice selected in block 312. This address in the last level cache is mapped to an address in the off-chip memory using additional address mapping logic as for example explained below and in conjunction with FIG. 6. "Address mapping logic" refers to logic that maps an address comprising instructions or data in a first memory to a corresponding address for the instructions or data in a second memory.

Figure 4:
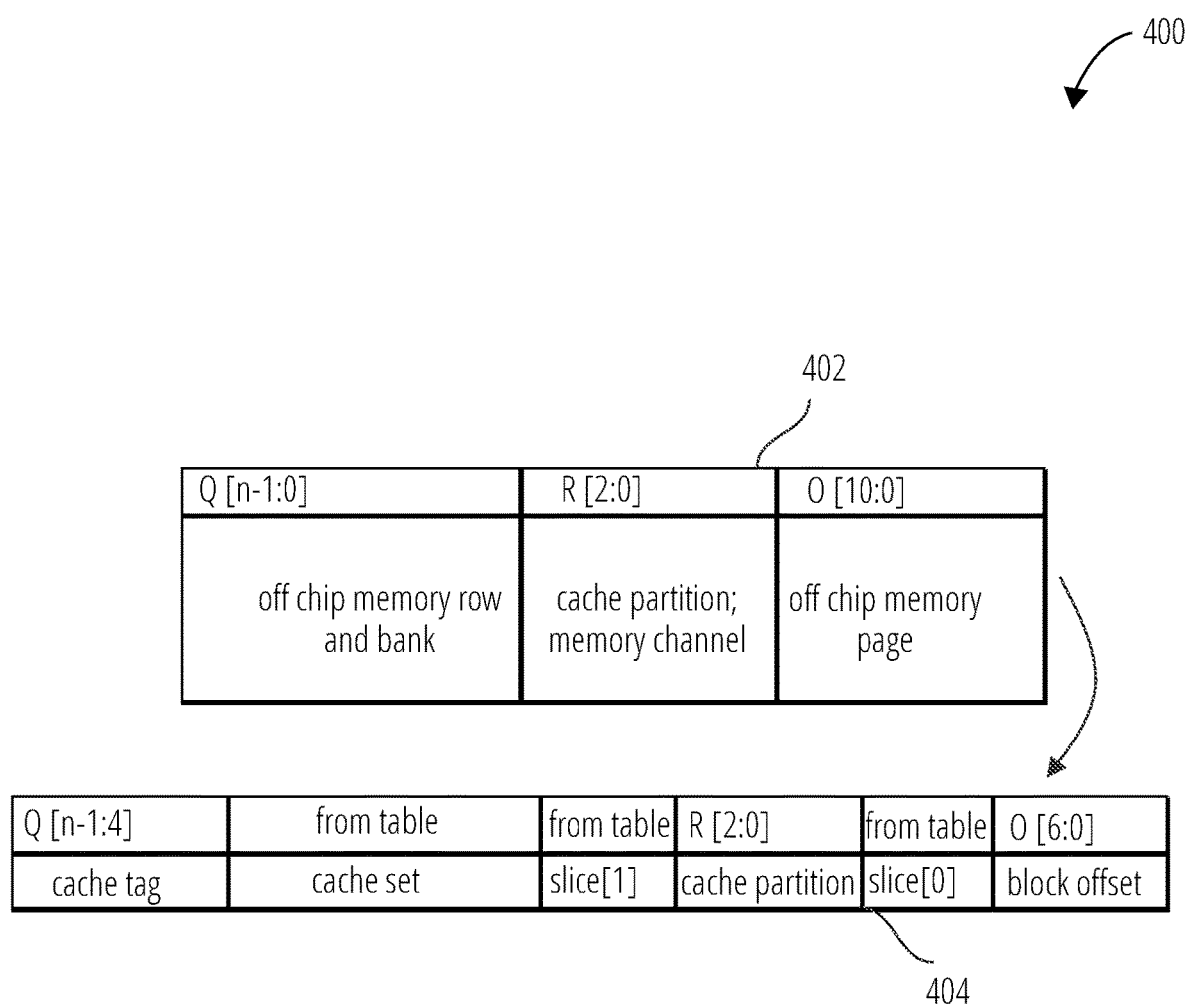
FIG. 4 depicts an address mapping process 400 in accordance with one embodiment.
Figure 5:
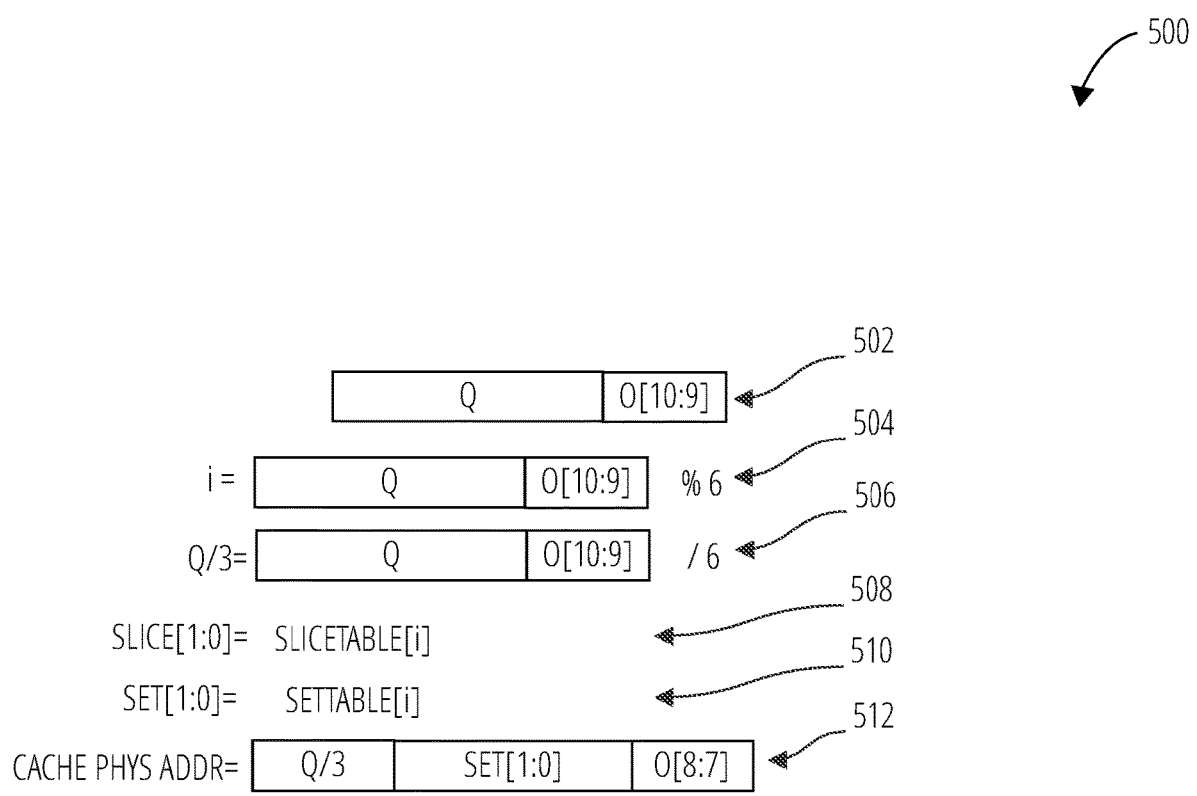
FIG. 5 depicts a last level cache physical address formation 500 in accordance with one embodiment.

Referring to the address mapping process 400 and last level cache physical address formation 500 of FIG. 4 and FIG. 5, an address 402 directed to the LLC from a memory client is delineated into fields for a cache partition id, a memory channel id, and a page address (O) in the memory 106. The remaining bits (Q) of the address specify the row and bank within the memory 106.

The Q and O bits are used along with mapping tables to generate the last level cache address 404. When there are three operative slices in the LLC partition, the address mapping logic 114 divides Q by 3*(number of memory partitions). The address mapping logic 114 may then form the last level cache address for example as set forth in the example code listing below. The code listing is an example for a system with off-chip memory organized into two partitions that is utilized with a four-way set-associative LLC having three operative slices:

int set0Table[6]={0,1,0,2,1,3};
    int slice0Table[6]={0,0,1,0,1,0};
    int set1Table[6]={0,2,1,3,2,3};
    int slice1Table[6]={2,1,2,1,2,2};
    uint64    setSliceConcat=(((Q>>1)<<2)|bits<10,9>(O)); (concatenate Q and bits 10:9 of O 502)
    int sliceTableIndex=setSliceConcat % 6; (compute mapping tables index 504)
    this→ m_slice=bit<0>(Q)? slice1Table[sliceTableIndex]: slice0Table[sliceTableIndex]; (get slice index from slice mapping table 508)
    uint64 m_l2set_2bits=bit<0>(Q)? set1Table[sliceTableIndex]: set0Table[sliceTableIndex]; (get set index from set mapping table 510)
    uint64 m_Qby3=setSliceConcat/6; (compute Q/3 506)
    // (form last level cache physical address 512)
    this->m_padr=(m_Qby3<<4)|(m_l2set_2bits<<2) |bits<8,7>(O);
    this→ m_l2addrin=(this→ m_padr<<7)|bits<6,0>(O);
    where m_l2addrin is an address that is local to each L2 slice and the slice ID is m_slice.

The two offset bits O[10:9] and the low order Q bits are simultaneously selecting one of three slices and one of the four sets per slice in this example.

For a 128 byte cacheline, O[6:0] is the address of the data within each cacheline (the length of O[] will vary according the size of the cacheline). The offset bits 8:7 identify the LLC set. An integrated circuit device may be manufactured with only three slices or may include four or more slices and be configured into three operative slices, thus activating the address mapping logic 114. In other words, in some cases the address mapping logic may be present in the integrated circuit but only activates when one of the memory slices is "turned off" for some reason.

Figure 6:
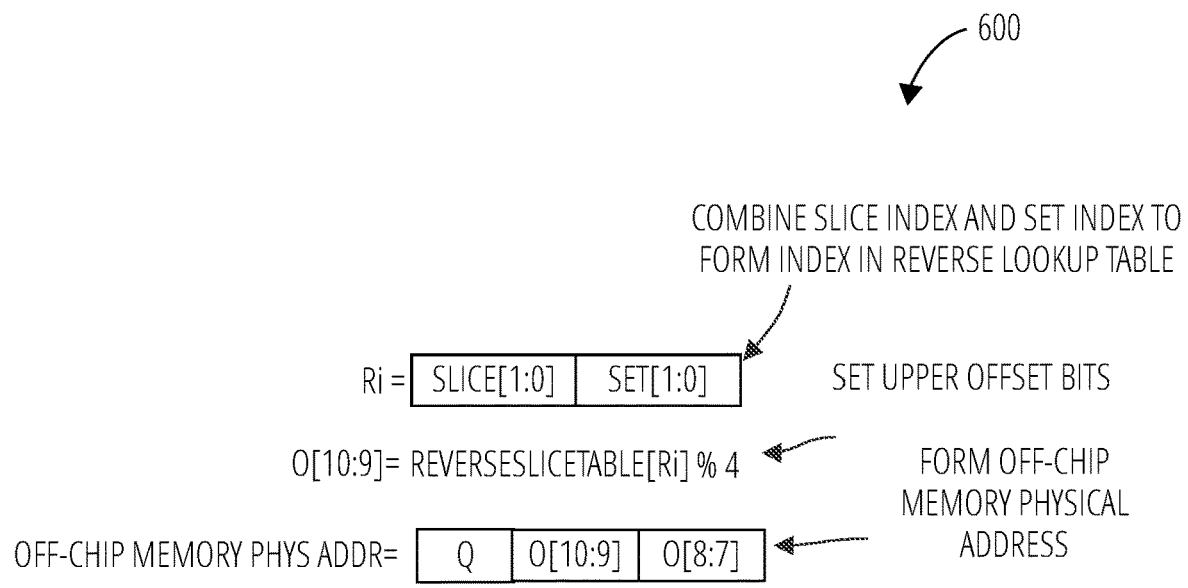
FIG. 6 depicts a system memory physical address formation 600 in accordance with one embodiment.

FIG. 6 depicts a system memory physical address formation 600 according to one embodiment. A reverse mapping is utilized to derive the DRAM (e.g., HMB) address m_fb_padr as follows:

uint32 reverseQTable[]={0,0,0,0,0,0,1,1,1,1,1,1};
    uint32 reverseOTable[]={0,1,3,5,2,4,1,3,0,2,4,5};
    uint32 reverseIndex=(this→ m_slice<<2)|((this→ m_padr>>2) & (uint64) 0×3); //reverseIndex is a number between 0-11
    uint32 recoveredSliceTableIndex=reverseOTable[reverseIndex];
    uint32 recovered_Q_0=reverseQTable[reverseIndex];
    uint64 reverseQby3=this→ m_padr>>4;
    uint64 reverseSetSliceConcat=reverseQby3*6+recoveredSliceTableIndex;
    uint64 recovered)Q=((reverseSetSliceConcat>>2)<<1) |recovered_Q_0;
    uint32 recovered_O_109=reverseSetSliceConcat & (uint64) 0×3;
    uint32 recovered_O=((recovered_O_109<<2)|(this→ m_padr & (uint64) 0×3))<<7;
    temp_m_padr=((recovered_O_109>>1)<<3)|(bit<10> (recovered_O)<<2)|bits<8,7>(recovered_O);
    temp_m_slice=(bit<0>(recovered_Q)<<1)|bit<9>(recovered_O);
    this→ m_fb_padr=((temp_m_padr>>3)<<4)|(bit<2> (temp_m_padr)<<3)|(bit<0>(temp_m_slice)<<2)|bits<1,0> (temp_m_padr);

Address mapping in accordance with the example embodiments above efficiently and evenly maps memory addresses and thus traffic between the off-chip memory (for example) and the last level cache when the number of operative memory slices is not evenly divisible by the number of active memory channels. In particular the slice and set mapping tables evenly balance memory traffic between the system memory and the last level cache. There are no holes in the virtual or physical address spaces and the capacity of the last level cache is fully utilized. The routing between the last level cache and the off-chip memory does not require a full crossbar switch.

Three Slice Embodiment for HBM

Figure 7:
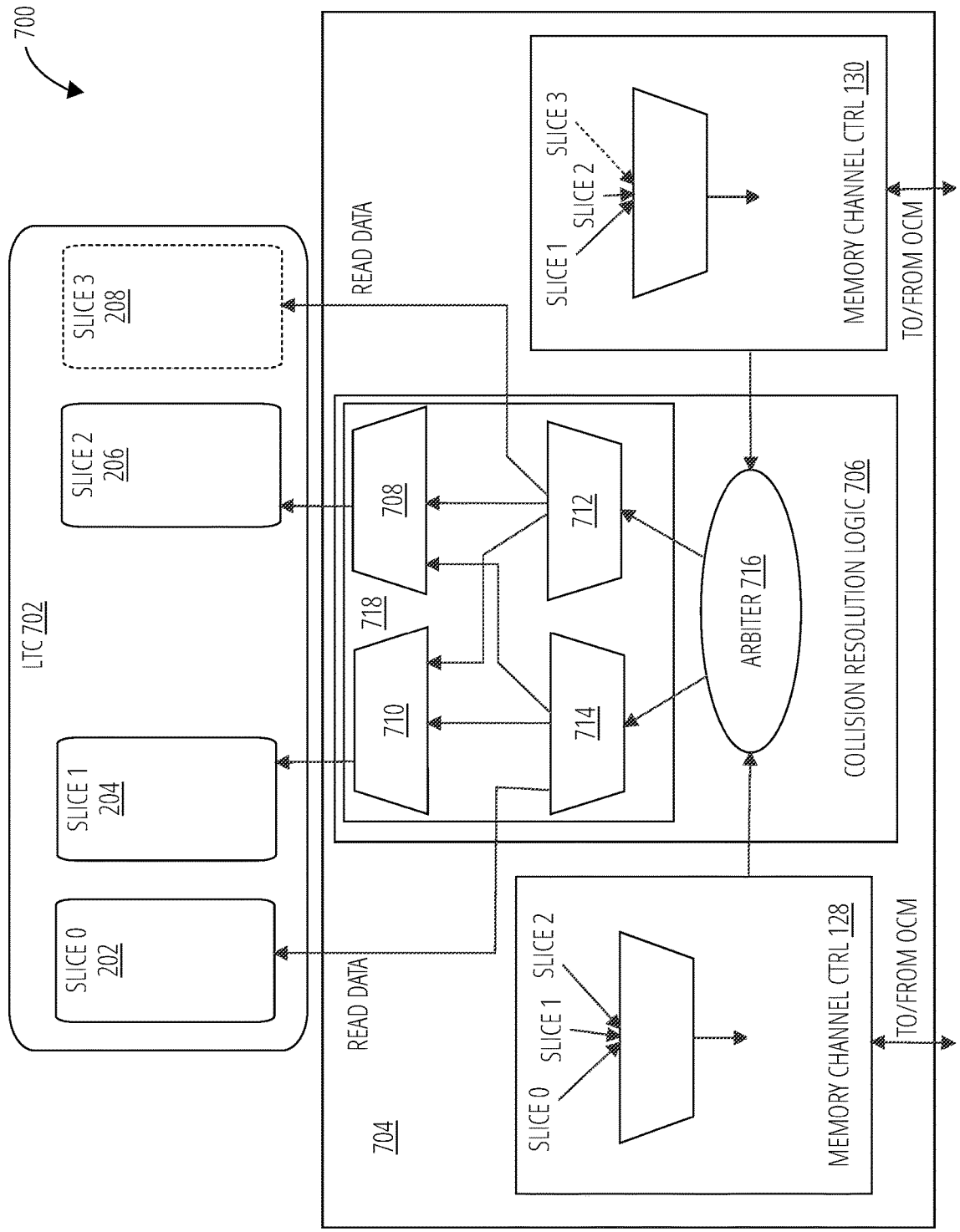
FIG. 7 depicts a three slice system 700 in accordance with one embodiment.

Referring to FIG. 7, in one embodiment a three-slice system 700 for use with HBM comprises a frame buffer partition 704 comprising the first memory channel controller 128 and the second memory channel controller 130. The last level cache partition 702 has four cache slices depicted (cache slice 202, cache slice 204, cache slice 206, and optional cache slice 208). The cache slice 208 has either been disabled or was never implemented at all in the three-slice system 700.

The collision resolution logic 706 routes data read from first memory device 116 to one of the operable slices of the last level cache partition 702. Because the cache slice 208 is unavailable in this example the first memory channel controller 128 and the second memory channel controller 130 share one or more of the operable slices. In particular the first memory channel controller 128 and second memory channel controller 130 share cache slice 204 and cache slice 206, which are dedicated to those two memory channels, whereas cache slice 202 is for the exclusive use of (dedicated to) the first memory channel controller 128.

To deal with contention for the shared memory slices, the collision resolution logic 706 includes an arbiter such as arbiter 716 to arbitrate (serialize) the reading and writing of data from memory 106 to the shared cache slices and vice versa. "Shared memory slice" refers to a memory slice utilized by multiple memory channels. "Arbiter" refers to logic that arbitrates access to a shared resource in a system. The use of non-shared memory slices reduces the overall contention that takes place for the slices. "Non-shared memory slices" is another term for memory slices dedicated to use by one particular memory channel.

The collision resolution logic 706 comprises a slice router 718 to route data to the different slices of the last level cache partition 702. The slice router 718 depicted in this example is implemented using multiplexers and demultiplexers (multiplexer 708, multiplexer 710, demultiplexer 712, and demultiplexer 714), the operation of which will be evident to those skilled in the art. The use of the multiplexer 710 and the multiplexer 708 enables any of the slices to be disabled, for example to create different versions of the chip (e.g., one four slice version and one three slice version) or to disable any of the four slices that don't pass a functional test. The clock driving the last level cache partition 702 may run significantly faster (e.g., 8× faster) than the clock driving the off-chip memory which substantially decreases the probability of a cache slice collision.

Figure 8:
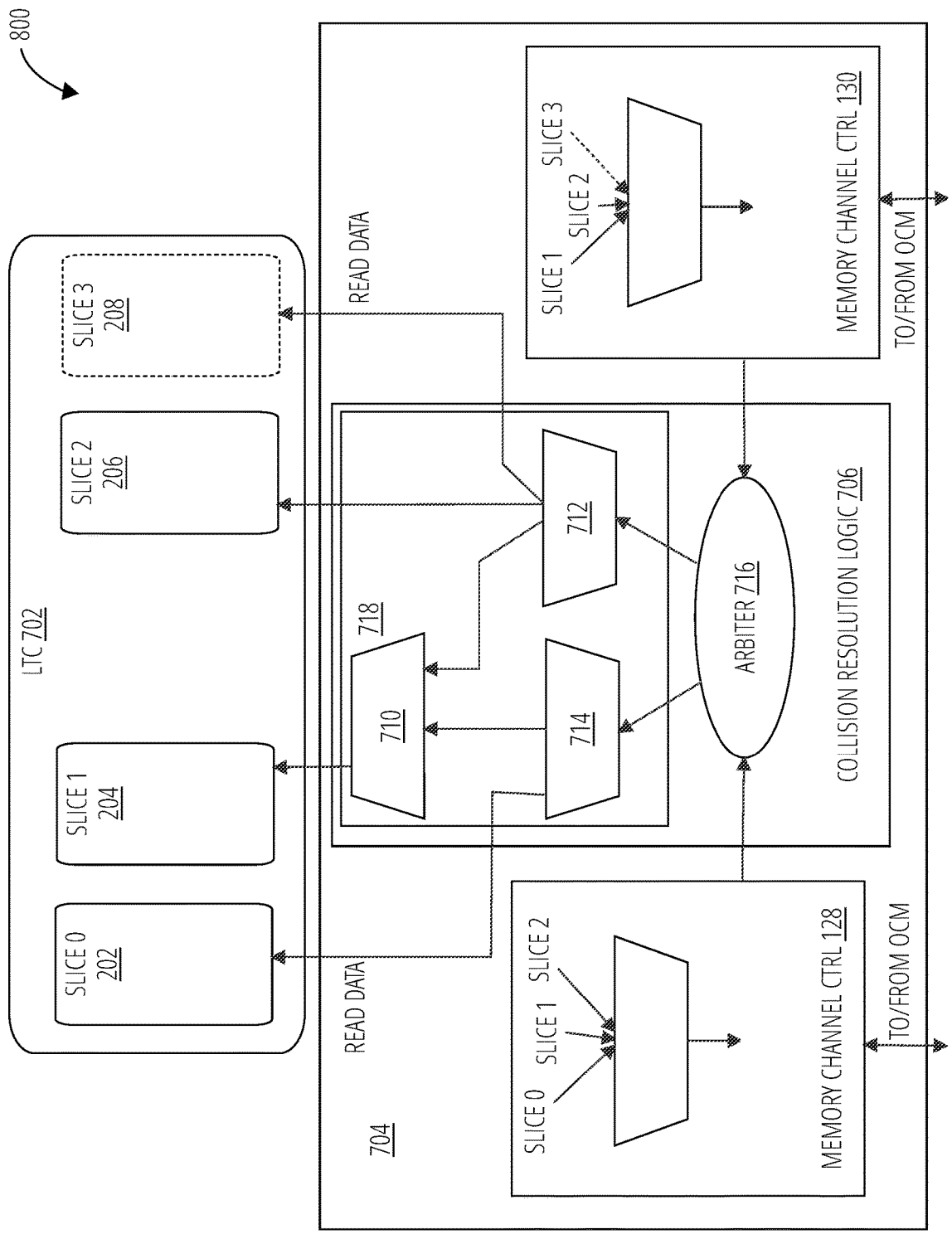
FIG. 8 depicts a three-slice system 800 in accordance with another embodiment.

FIG. 8 depicts an alternative embodiment of a three-slice system 800 in which only a single cache slice 204 is shared. The multiplexer 708 is not utilized in this embodiment. This embodiment is somewhat less flexible than the three-slice system 700 in that it does allow for disabling (making inoperative) any of the slices.

The various components of the three-slice system 700 and three-slice system 800 are depicted at a high level and will generally comprise other features known in the art but not depicted.

Five Slice Embodiments

Figure 9:
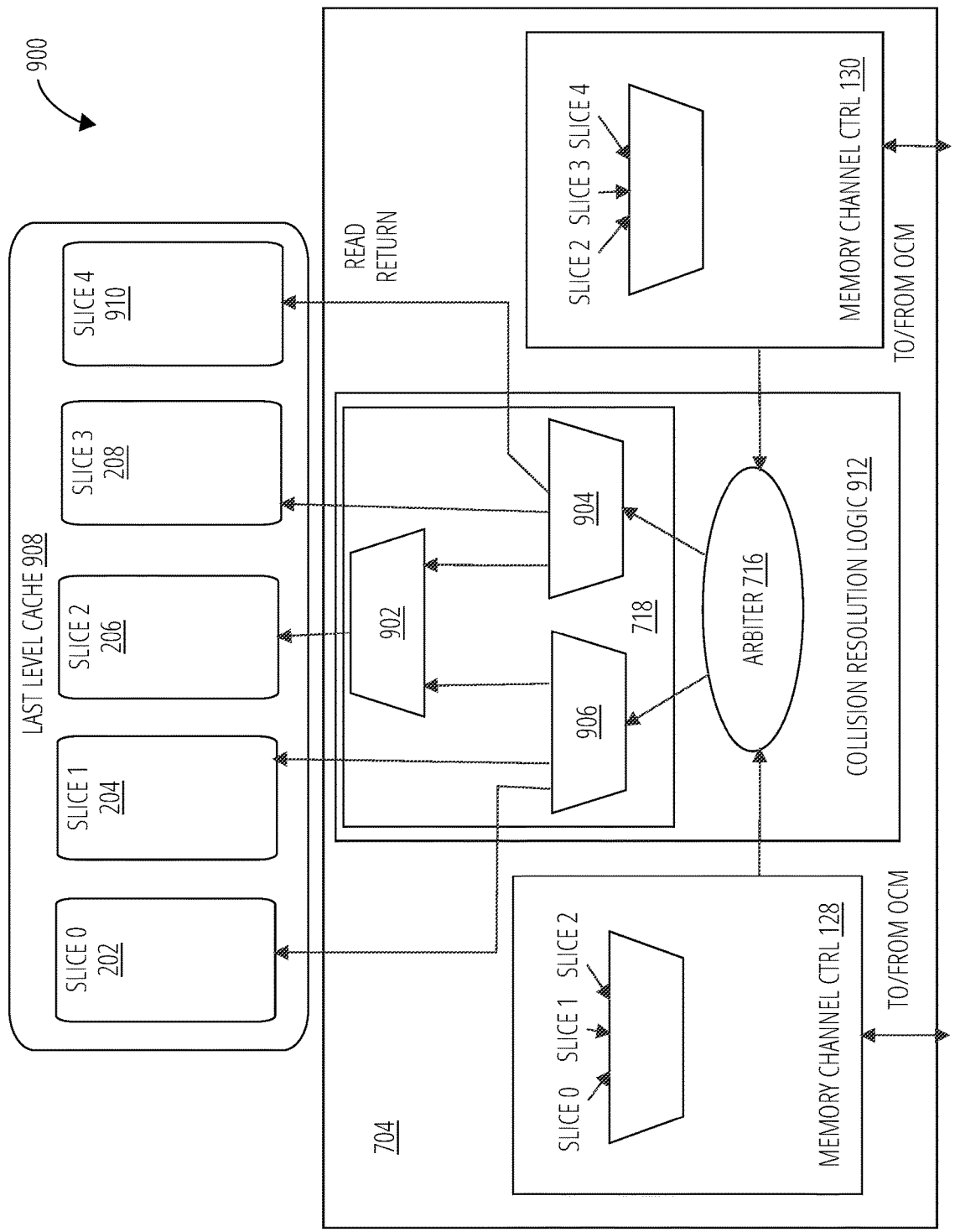
FIG. 9 depicts a five slice system 900 in accordance with one embodiment.

FIG. 9 depicts an embodiment of a five-slice system 900 for a last level cache 908 interfaced to HBM. The cache slice 206 is configured to be a shared slice between the first memory channel controller 128 and the second memory channel controller 130. The slice router 718 of the collision resolution logic 912 in this example comprises a multiplexer 902, a demultiplexer 904, and a demultiplexer 906 and routes data read from first memory device 116 to the appropriate one of the five slices of the last level cache partition 702 (e.g., the previously introduced slices and an additional cache slice 4 910). The five-slice system 900 depicts a single shared cache slice 206 with three dedicated cache slices. Five slice embodiments comprising more than one shared slice will be readily apparent in view of the three-slice system 700 with multiple shared sliced depicted in FIG. 7, and the totality of this disclosure.

Address Mapping (Five Slice System Example)

An example of address mapping logic for the five-slice system 900 embodiment mapping to two memory channels 128 and 130 follows and will be readily understood in view of the examples and descriptions above for three-slice systems:

int slice0Table[5]={0,1,0,1,2};
    int slice1Table[5]={3,4,3,4,2};
    int set0Table[5]={0,0,1,1,0};
    int set1Table[5]={0,0,1,1,1};
    int64 setSliceConcat=((Q<<2)|bits<10,9>(O));
    int tableIndex=setSliceConcat % 5;
    // O[11] is memory channel
    m_slice=bit<11>(O) ? slice1Table[tableIndex]: slice0Table[tableIndex];
    int 12set_1bit=bit<11>(O) ? set1Table[tableIndex]: set0Table[tableIndex];
    int64 Qby5=setSliceConcat/5;
    m_padr=(Qby5<<3)|(12set_1bit<<2)|bits<8,7>(O);
    m_12addrin=m_padr<<7)|bits<6,0>(O);

Three address bits are needed to map five slices and there are two channels in this example. Multiplying five times two yields ten total table entries, minimum. Implemented as a table per channel, O[11] is used as a memory channel select bit.

A reverse mapping for the DRAM address may be readily derived from the above and the examples and descriptions for the three-slice reverse mapping previously described.

Figure 10:
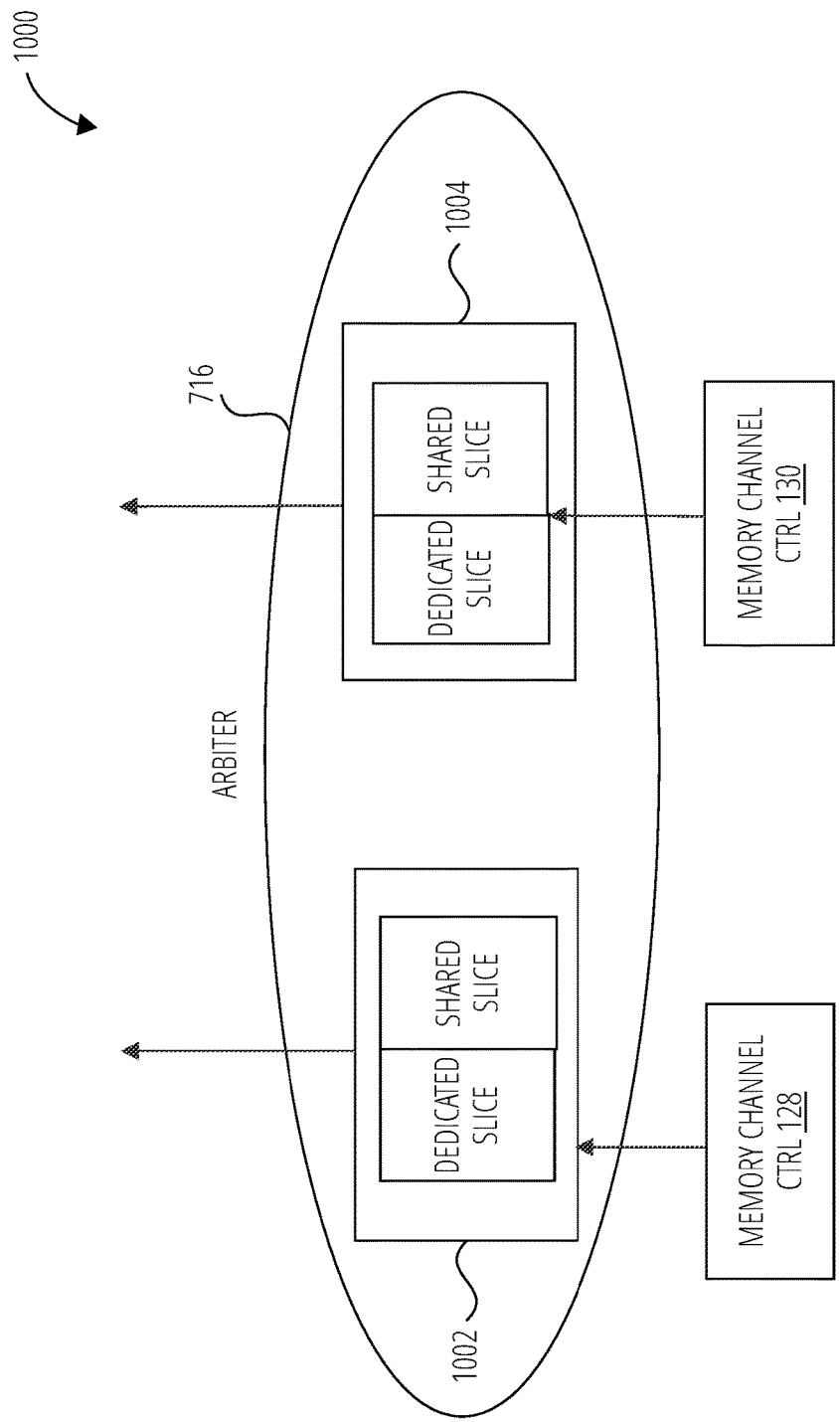
FIG. 10 depicts arbiter logic 1000 in accordance with one embodiment.

FIG. 10 depicts arbiter logic 1000 in one embodiment. The arbiter 716 comprises a first dual threaded FIFO 1002 and a second dual threaded FIFO 1004. Each of the dual threaded FIFOs comprises one thread for each of the dedicated slices of the last level cache partition, and one thread for the shared slice of the last level cache partition. On a single clock cycle of the last level cache partition, each of the threads for the unshared slices can return data to the last level cache partition. However, on a single clock cycle, data from only one of the FIFOs for the shared slice is returned to the last level cache partition.

A parallel processing and graphics processing unit architecture will now be described in which the odd-numbered slice mechanisms disclosed herein may be implemented. A computer system that may utilized the disclosed mechanisms is also disclosed. Generally, the mechanisms are applicable to any device utilizing a sliced memory system.

The following description may use certain acronyms and abbreviations as follows:

"DPC" refers to a "Data Processing Clusters";
"GPC" refers to a "general processing cluster";
"I/O" refers to a "input/output";
"L1 cache" refers to "level one cache";
"L2 cache" refers to "level two cache";
"LSU" refers to a "load/store unit";
"MMU" refers to a "memory management unit";
"MPC" refers to an "M-pipe controller";
"PPU" refers to a "parallel processing unit";
"PROP" refers to a "pre-raster operations unit";
"ROP" refers to a "Raster Operations";
"SFU" refers to a "special function unit";
"SM" refers to a "streaming multiprocessor";
"Viewport SCC" refers to "viewport scale, cull, and clip";
"WDX" refers to a "work distribution crossbar"; and
"XBar" refers to a "crossbar".

Parallel Processing Architecture

Figure 11:
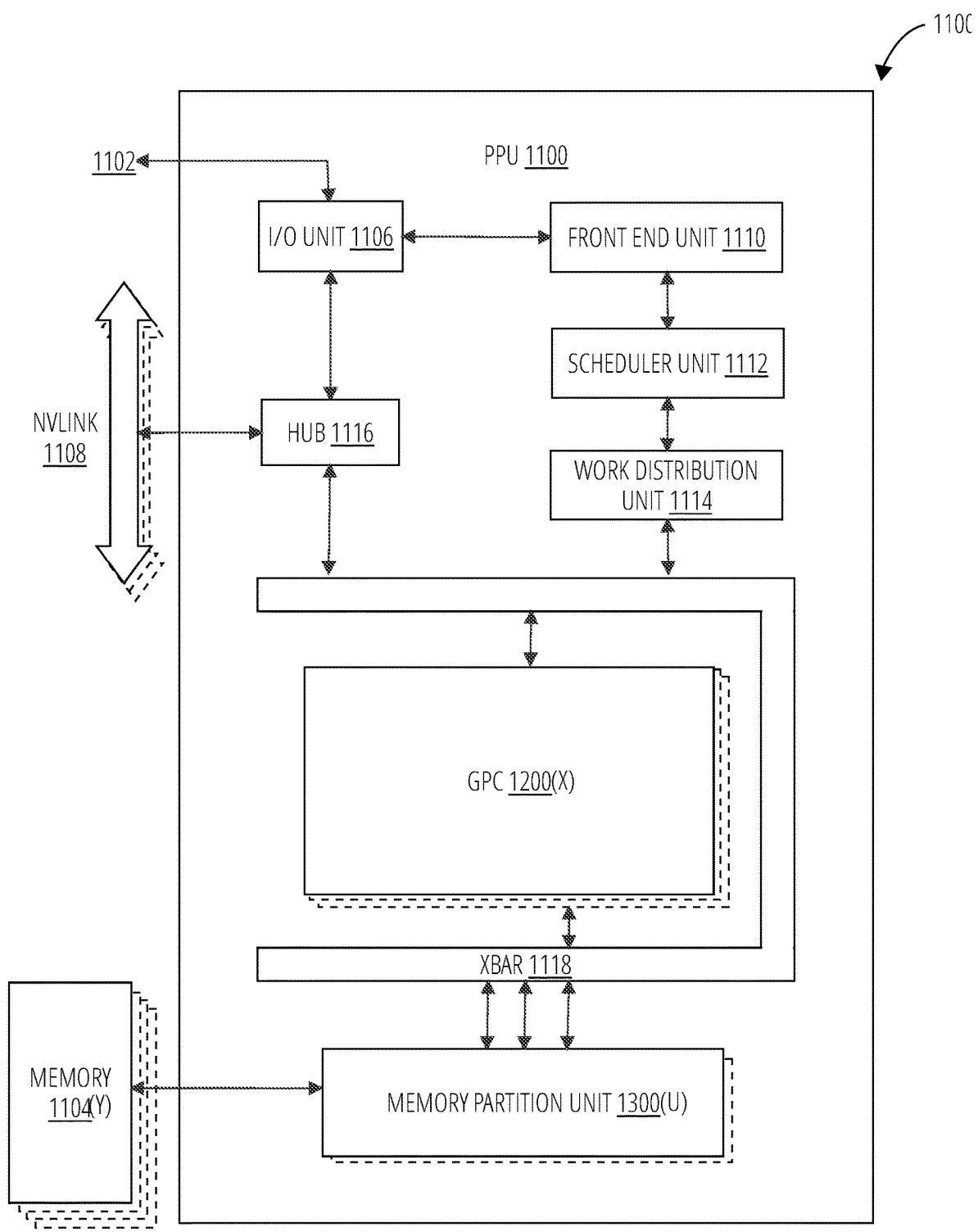
FIG. 11 depicts a PPU 1100 in accordance with one embodiment.

FIG. 11 depicts a PPU 1100, in accordance with an embodiment. In an embodiment, the PPU 1100 is a multi-threaded processor that is implemented on one or more integrated circuit devices. The PPU 1100 is a latency hiding architecture designed to process many threads in parallel. A thread (e.g., a thread of execution) is an instantiation of a set of instructions configured to be executed by the PPU 1100. In an embodiment, the PPU 1100 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 1100 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPU 1100 modules may be configured to accelerate thousands of High Performance Computing (HPC), data center, and machine learning applications. The PPU 1100 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 11, the PPU 1100 includes an I/O unit 1106, a front-end unit 1110, a scheduler unit 1112, a work distribution unit 1114, a hub 1116, an XBar 1118, one or more GPC 1200 modules, and one or more memory partition unit 1300 modules. The PPU 1100 may be connected to a host processor or other PPU 1100 modules via one or more high-speed NVLink 1108 interconnects. The PPU 1100 may be connected to a host processor or other peripheral devices via an interconnect 1102. The PPU 1100 may also be connected to a local memory comprising a number of memory 1104 devices. In an embodiment, the local memory may comprise a number of dynamic random-access memory (DRAM) devices. The DRAM devices may be configured as a high-bandwidth memory (HBM) subsystem, with multiple DRAM dies stacked within each device.

The NVLink 1108 interconnect enables systems to scale and include one or more PPU 1100 modules combined with one or more CPUs, supports cache coherence between the PPU 1100 modules and CPUs, and CPU mastering. Data and/or commands may be transmitted by the NVLink 1108 through the hub 1116 to/from other units of the PPU 1100 such as one or more copy engines, a video encoder, a video decoder, a power management unit, etc. (not explicitly shown). The NVLink 1108 is described in more detail in conjunction with FIG. 15.

The I/O unit 1106 is configured to transmit and receive communications (e.g., commands, data, etc.) from a host processor (not shown) over the interconnect 1102. The I/O unit 1106 may communicate with the host processor directly via the interconnect 1102 or through one or more intermediate devices such as a memory bridge. In an embodiment, the I/O unit 1106 may communicate with one or more other processors, such as one or more PPU 1100 modules via the interconnect 1102. In an embodiment, the I/O unit 1106 implements a Peripheral Component Interconnect Express (PCIe) interface for communications over a PCIe bus and the interconnect 1102 is a PCIe bus. In alternative embodiments, the I/O unit 1106 may implement other types of well-known interfaces for communicating with external devices.

The I/O unit 1106 decodes packets received via the interconnect 1102. In an embodiment, the packets represent commands configured to cause the PPU 1100 to perform various operations. The I/O unit 1106 transmits the decoded commands to various other units of the PPU 1100 as the commands may specify. For example, some commands may be transmitted to the front-end unit 1110. Other commands may be transmitted to the hub 1116 or other units of the PPU 1100 such as one or more copy engines, a video encoder, a video decoder, a power management unit, etc. (not explicitly shown). In other words, the I/O unit 1106 is configured to route communications between and among the various logical units of the PPU 1100.

In an embodiment, a program executed by the host processor encodes a command stream in a buffer that provides workloads to the PPU 1100 for processing. A workload may comprise several instructions and data to be processed by those instructions. The buffer is a region in a memory that is accessible (e.g., read/write) by both the host processor and the PPU 1100. For example, the I/O unit 1106 may be configured to access the buffer in a system memory connected to the interconnect 1102 via memory requests transmitted over the interconnect 1102. In an embodiment, the host processor writes the command stream to the buffer and then transmits a pointer to the start of the command stream to the PPU 1100. The front-end unit 1110 receives pointers to one or more command streams. The front-end unit 1110 manages the one or more streams, reading commands from the streams and forwarding commands to the various units of the PPU 1100.

The front-end unit 1110 is coupled to a scheduler unit 1112 that configures the various GPC 1200 modules to process tasks defined by the one or more streams. The scheduler unit 1112 is configured to track state information related to the various tasks managed by the scheduler unit 1112. The state may indicate which GPC 1200 a task is assigned to, whether the task is active or inactive, a priority level associated with the task, and so forth. The scheduler unit 1112 manages the execution of a plurality of tasks on the one or more GPC 1200 modules.

The scheduler unit 1112 is coupled to a work distribution unit 1114 that is configured to dispatch tasks for execution on the GPC 1200 modules. The work distribution unit 1114 may track a number of scheduled tasks received from the scheduler unit 1112. In an embodiment, the work distribution unit 1114 manages a pending task pool and an active task pool for each of the GPC 1200 modules. The pending task pool may comprise a number of slots (e.g., 32 slots) that contain tasks assigned to be processed by a particular GPC 1200. The active task pool may comprise a number of slots (e.g., 4 slots) for tasks that are actively being processed by the GPC 1200 modules. As a GPC 1200 finishes the execution of a task, that task is evicted from the active task pool for the GPC 1200 and one of the other tasks from the pending task pool is selected and scheduled for execution on the GPC 1200. If an active task has been idle on the GPC 1200, such as while waiting for a data dependency to be resolved, then the active task may be evicted from the GPC 1200 and returned to the pending task pool while another task in the pending task pool is selected and scheduled for execution on the GPC 1200.

The work distribution unit 1114 communicates with the one or more GPC 1200 modules via XBar 1118. The XBar 1118 is an interconnect network that couples many of the units of the PPU 1100 to other units of the PPU 1100. For example, the XBar 1118 may be configured to couple the work distribution unit 1114 to a particular GPC 1200. Although not shown explicitly, one or more other units of the PPU 1100 may also be connected to the XBar 1118 via the hub 1116.

The tasks are managed by the scheduler unit 1112 and dispatched to a GPC 1200 by the work distribution unit 1114. The GPC 1200 is configured to process the task and generate results. The results may be consumed by other tasks within the GPC 1200, routed to a different GPC 1200 via the XBar 1118, or stored in the memory 1104. The results can be written to the memory 1104 via the memory partition unit 1300 modules, which implement a memory interface for reading and writing data to/from the memory 1104. The results can be transmitted to another PPU 1100 or CPU via the NVLink 1108. In an embodiment, the PPU 1100 includes a number U of memory partition unit 1300 modules that is equal to the number of separate and distinct memory 1104 devices coupled to the PPU 1100. A memory partition unit 1300 will be described in more detail below in conjunction with FIG. 13.

In an embodiment, a host processor executes a driver kernel that implements an application programming interface (API) that enables one or more applications executing on the host processor to schedule operations for execution on the PPU 1100. In an embodiment, multiple compute applications are simultaneously executed by the PPU 1100 and the PPU 1100 provides isolation, quality of service (QoS), and independent address spaces for the multiple compute applications. An application may generate instructions (e.g., API calls) that cause the driver kernel to generate one or more tasks for execution by the PPU 1100. The driver kernel outputs tasks to one or more streams being processed by the PPU 1100. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 14.

Figure 12:
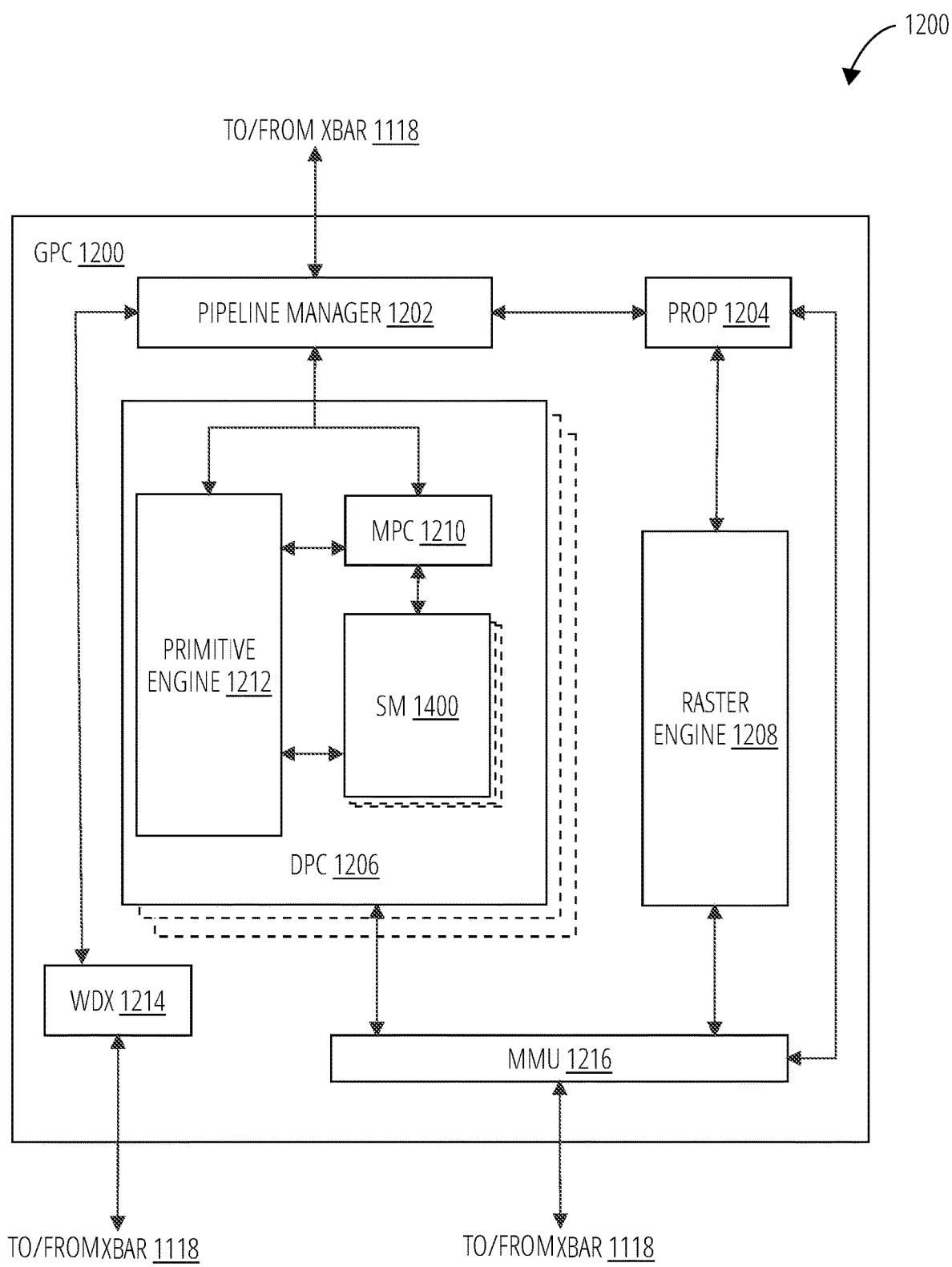
FIG. 12 depicts a GPC 1200 in accordance with one embodiment.

FIG. 12 depicts a GPC 1200 of the PPU 1100 of FIG. 11, in accordance with an embodiment. As shown in FIG. 12, each GPC 1200 includes a number of hardware units for processing tasks. In an embodiment, each GPC 1200 includes a pipeline manager 1202, a PROP 1204, a raster engine 1208, a WDX 1214, an MMU 1216, and one or more DPC 1206. It will be appreciated that the GPC 1200 of FIG. 12 may include other hardware units in lieu of or in addition to the units shown in FIG. 12.

In an embodiment, the operation of the GPC 1200 is controlled by the pipeline manager 1202. The pipeline manager 1202 manages the configuration of the one or more DPC 1206 modules for processing tasks allocated to the GPC 1200. In an embodiment, the pipeline manager 1202 may configure at least one of the one or more DPC 1206 modules to implement at least a portion of a graphics rendering pipeline. For example, a DPC 1206 may be configured to execute a vertex shader program on the programmable SM 1400. The pipeline manager 1202 may also be configured to route packets received from the work distribution unit 1114 to the appropriate logical units within the GPC 1200. For example, some packets may be routed to fixed function hardware units in the PROP 1204 and/or raster engine 1208 while other packets may be routed to the DPC 1206 modules for processing by the primitive engine 1212 or the SM 1400. In an embodiment, the pipeline manager 1202 may configure at least one of the one or more DPC 1206 modules to implement a neural network model and/or a computing pipeline.

Figure 13:
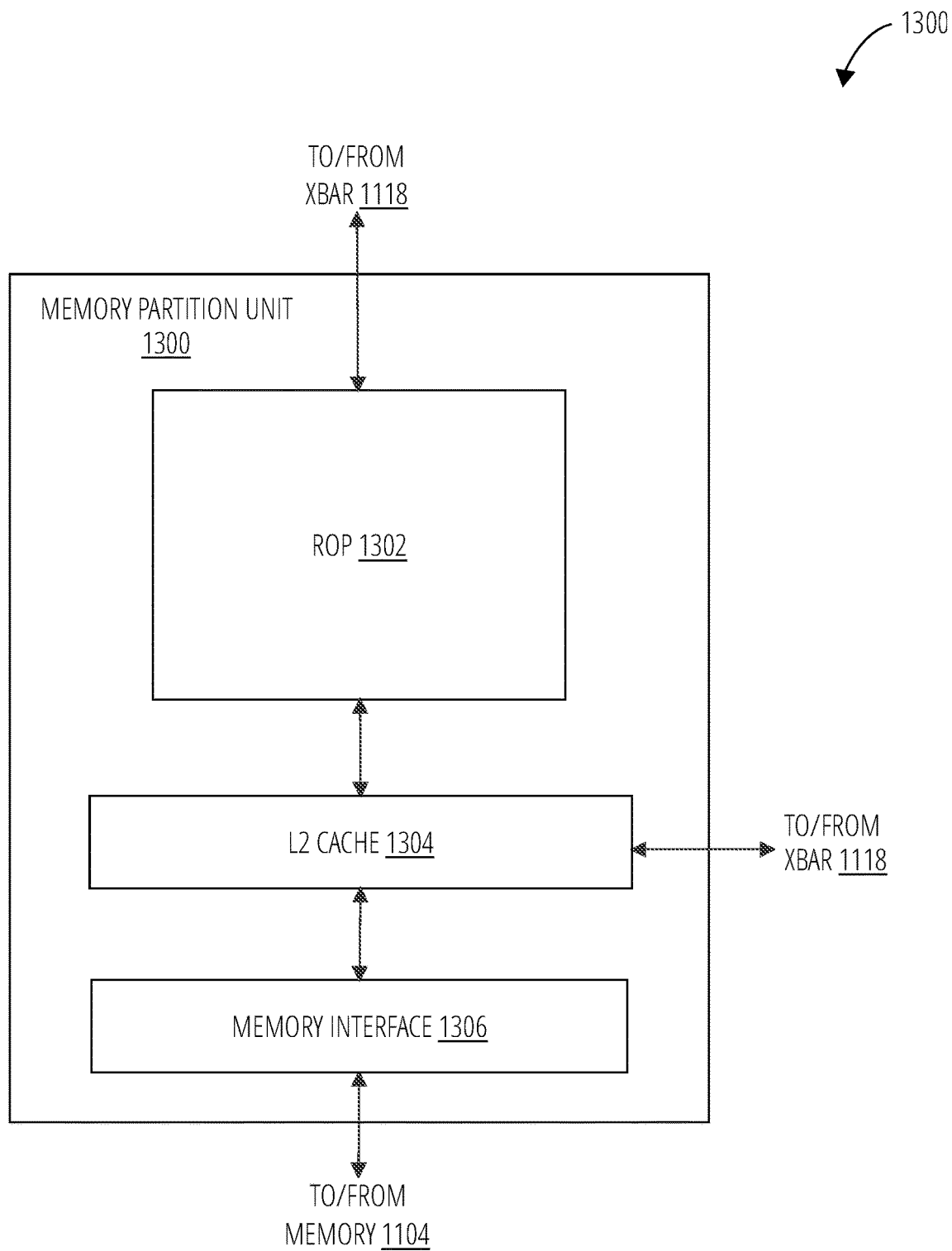
FIG. 13 depicts a memory partition unit 1300 in accordance with one embodiment.

The PROP 1204 is configured to route data generated by the raster engine 1208 and the DPC 1206 modules to a Raster Operations (ROP) unit, described in more detail in conjunction with FIG. 13. The PROP 1204 may also be configured to perform optimizations for color blending, organize pixel data, perform address translations, and the like.

The raster engine 1208 includes a number of fixed function hardware units configured to perform various raster operations. In an embodiment, the raster engine 1208 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x, y coverage mask for a tile) for the primitive. The output of the coarse raster engine is transmitted to the culling engine where fragments associated with the primitive that fail a z-test are culled and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 1208 comprises fragments to be processed, for example, by a fragment shader implemented within a DPC 1206.

Each DPC 1206 included in the GPC 1200 includes an MPC 1210, a primitive engine 1212, and one or more SM 1400 modules. The MPC 1210 controls the operation of the DPC 1206, routing packets received from the pipeline manager 1202 to the appropriate units in the DPC 1206. For example, packets associated with a vertex may be routed to the primitive engine 1212, which is configured to fetch vertex attributes associated with the vertex from the memory 1104. In contrast, packets associated with a shader program may be transmitted to the SM 1400.

The SM 1400 comprises a programmable streaming processor that is configured to process tasks represented by a number of threads. Each SM 1400 is multi-threaded and configured to execute a plurality of threads (e.g., 32 threads) from a particular group of threads concurrently. In an embodiment, the SM 1400 implements a Single-Instruction, Multiple-Data (SIMD) architecture where each thread in a group of threads (e.g., a warp) is configured to process a different set of data based on the same set of instructions. All threads in the group of threads execute the same instructions. In another embodiment, the SM 1400 implements a Single-Instruction, Multiple Thread (SIMT) architecture where each thread in a group of threads is configured to process a different set of data based on the same set of instructions, but where individual threads in the group of threads are allowed to diverge during execution. In an embodiment, a program counter, call stack, and execution state are maintained for each warp, enabling concurrency between warps and serial execution within warps when threads within the warp diverge. In another embodiment, a program counter, call stack, and execution state are maintained for each individual thread, enabling equal concurrency between all threads, within and between warps. When execution state is maintained for each individual thread, threads executing the same instructions may be converged and executed in parallel for maximum efficiency. The SM 1400 will be described in more detail below in conjunction with FIG. 14.

The MMU 1216 provides an interface between the GPC 1200 and the memory partition unit 1300. The MMU 1216 may provide translation of virtual addresses into physical addresses, memory protection, and arbitration of memory requests. In an embodiment, the MMU 1216 provides one or more translation lookaside buffers (TLB s) for performing translation of virtual addresses into physical addresses in the memory 1104.

FIG. 13 depicts a memory partition unit 1300 of the PPU 1100 of FIG. 11, in accordance with an embodiment. As shown in FIG. 13, the memory partition unit 1300 includes a ROP 1302, an L2 cache 1304, and a memory interface 1306. The memory interface 1306 is coupled to the memory 1104. Memory interface 1306 may implement 32, 64, 128, 1024-bit data buses, or the like, for high-speed data transfer. In an embodiment, the PPU 1100 incorporates U memory interface 1306 modules, one memory interface 1306 per pair of memory partition unit 1300 modules, where each pair of memory partition unit 1300 modules is connected to a corresponding memory 1104 device. For example, PPU 1100 may be connected to up to Y memory 1104 devices, such as high bandwidth memory stacks or graphics double-data-rate, version 5, synchronous dynamic random-access memory, or other types of persistent storage.

In an embodiment, the memory interface 1306 implements an HBM2 memory interface and Y equals half U. In an embodiment, the HBM2 memory stacks are located on the same physical package as the PPU 1100, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 1104 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPU 1100 modules process very large datasets and/or run applications for extended periods.

In an embodiment, the PPU 1100 implements a multi-level memory hierarchy. In an embodiment, the memory partition unit 1300 supports a unified memory to provide a single unified virtual address space for CPU and PPU 1100 memory, enabling data sharing between virtual memory systems. In an embodiment the frequency of accesses by a PPU 1100 to memory located on other processors is traced to ensure that memory pages are moved to the physical memory of the PPU 1100 that is accessing the pages more frequently. In an embodiment, the NVLink 1108 supports address translation services allowing the PPU 1100 to directly access a CPU's page tables and providing full access to CPU memory by the PPU 1100.

In an embodiment, copy engines transfer data between multiple PPU 1100 modules or between PPU 1100 modules and CPUs. The copy engines can generate page faults for addresses that are not mapped into the page tables. The memory partition unit 1300 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 1104 or other system memory may be fetched by the memory partition unit 1300 and stored in the L2 cache 1304, which is located on-chip and is shared between the various GPC 1200 modules. As shown, each memory partition unit 1300 includes a portion of the L2 cache 1304 associated with a corresponding memory 1104 device. Lower level caches may then be implemented in various units within the GPC 1200 modules. For example, each of the SM 1400 modules may implement an L1 cache. The L1 cache is private memory that is dedicated to a particular SM 1400. Data from the L2 cache 1304 may be fetched and stored in each of the L1 caches for processing in the functional units of the SM 1400 modules. The L2 cache 1304 is coupled to the memory interface 1306 and the XBar 1118.

The ROP 1302 performs graphics raster operations related to pixel color, such as color compression, pixel blending, and the like. The ROP 1302 also implements depth testing in conjunction with the raster engine 1208, receiving a depth for a sample location associated with a pixel fragment from the culling engine of the raster engine 1208. The depth is tested against a corresponding depth in a depth buffer for a sample location associated with the fragment. If the fragment passes the depth test for the sample location, then the ROP 1302 updates the depth buffer and transmits a result of the depth test to the raster engine 1208. It will be appreciated that the number of partition memory partition unit 1300 modules may be different than the number of GPC 1200 modules and, therefore, each ROP 1302 may be coupled to each of the GPC 1200 modules. The ROP 1302 tracks packets received from the different GPC 1200 modules and determines which GPC 1200 that a result generated by the ROP 1302 is routed to through the XBar 1118. Although the ROP 1302 is included within the memory partition unit 1300 in FIG. 13, in other embodiment, the ROP 1302 may be outside of the memory partition unit 1300. For example, the ROP 1302 may reside in the GPC 1200 or another unit.

Figure 14:
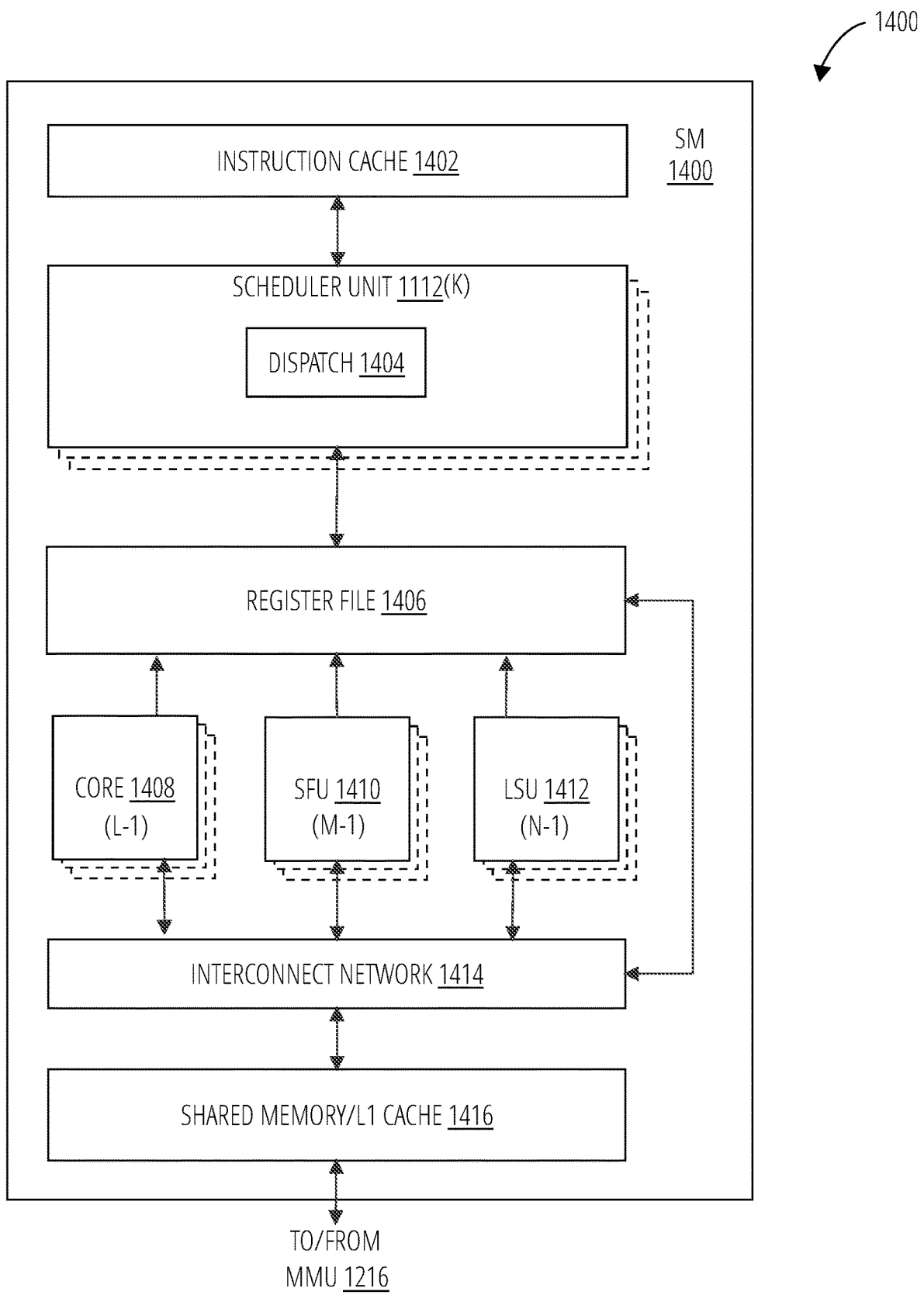
FIG. 14 depicts an SM 1400 in accordance with one embodiment.

FIG. 14 depicts the SM 1400 of FIG. 12, in accordance with an embodiment. As shown in FIG. 14, the SM 1400 includes an instruction cache 1402, one or more scheduler unit 1112 modules, a register file 1406, one or more processing core 1408 modules, one or more SFU 1410 modules, one or more LSU 1412 modules, an interconnect network 1414, and a shared memory/L1 cache 1416.

As described above, the work distribution unit 1114 dispatches tasks for execution on the GPC 1200 modules of the PPU 1100. The tasks are allocated to a particular DPC 1206 within a GPC 1200 and, if the task is associated with a shader program, the task may be allocated to an SM 1400. The scheduler unit 1112 receives the tasks from the work distribution unit 1114 and manages instruction scheduling for one or more thread blocks assigned to the SM 1400. The scheduler unit 1112 schedules thread blocks for execution as warps of parallel threads, where each thread block is allocated at least one warp. In an embodiment, each warp executes 32 threads. The scheduler unit 1112 may manage a plurality of different thread blocks, allocating the warps to the different thread blocks and then dispatching instructions from the plurality of different cooperative groups to the various functional units (e.g., core 1408 modules, SFU 1410 modules, and LSU 1412 modules) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch 1404 unit is configured to transmit instructions to one or more of the functional units. In the embodiment, the scheduler unit 1112 includes two dispatch 1404 units that enable two different instructions from the same warp to be dispatched during each clock cycle. In alternative embodiments, each scheduler unit 1112 may include a single dispatch 1404 unit or additional dispatch 1404 units.

Each SM 1400 includes a register file 1406 that provides a set of registers for the functional units of the SM 1400. In an embodiment, the register file 1406 is divided between each of the functional units such that each functional unit is allocated a dedicated portion of the register file 1406. In another embodiment, the register file 1406 is divided between the different warps being executed by the SM 1400. The register file 1406 provides temporary storage for operands connected to the data paths of the functional units.

Each SM 1400 comprises L processing core 1408 modules. In an embodiment, the SM 1400 includes a large number (e.g., 128, etc.) of distinct processing core 1408 modules. Each core 1408 may include a fully pipelined, single-precision, double-precision, and/or mixed precision processing unit that includes a floating-point arithmetic logic unit and an integer arithmetic logic unit. In an embodiment, the floating-point arithmetic logic units implement the IEEE 754-2008 standard for floating point arithmetic. In an embodiment, the core 1408 modules include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the core 1408 modules. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A'B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 1400 also comprises M SFU 1410 modules that perform special functions (e.g., attribute evaluation, reciprocal square root, and the like). In an embodiment, the SFU 1410 modules may include a tree traversal unit configured to traverse a hierarchical tree data structure. In an embodiment, the SFU 1410 modules may include texture unit configured to perform texture map filtering operations. In an embodiment, the texture units are configured to load texture maps (e.g., a 2D array of texels) from the memory 1104 and sample the texture maps to produce sampled texture values for use in shader programs executed by the SM 1400. In an embodiment, the texture maps are stored in the shared memory/L1 cache 1416. The texture units implement texture operations such as filtering operations using mip-maps (e.g., texture maps of varying levels of detail). In an embodiment, each SM 1400 includes two texture units.

Each SM 1400 also comprises N LSU 1412 modules that implement load and store operations between the shared memory/L1 cache 1416 and the register file 1406. Each SM 1400 includes an interconnect network 1414 that connects each of the functional units to the register file 1406 and the LSU 1412 to the register file 1406 and shared memory/L1 cache 1416. In an embodiment, the interconnect network 1414 is a crossbar that can be configured to connect any of the functional units to any of the registers in the register file 1406 and connect the LSU 1412 modules to the register file 1406 and memory locations in shared memory/L1 cache 1416.

The shared memory/L1 cache 1416 is an array of on-chip memory that allows for data storage and communication between the SM 1400 and the primitive engine 1212 and between threads in the SM 1400. In an embodiment, the shared memory/L1 cache 1416 comprises 128 KB of storage capacity and is in the path from the SM 1400 to the memory partition unit 1300. The shared memory/L1 cache 1416 can be used to cache reads and writes. One or more of the shared memory/L1 cache 1416, L2 cache 1304, and memory 1104 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 1416 enables the shared memory/L1 cache 1416 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 11, are bypassed, creating a much simpler programming model. In the general-purpose parallel computation configuration, the work distribution unit 1114 assigns and distributes blocks of threads directly to the DPC 1206 modules. The threads in a block execute the same program, using a unique thread ID in the calculation to ensure each thread generates unique results, using the SM 1400 to execute the program and perform calculations, shared memory/L1 cache 1416 to communicate between threads, and the LSU 1412 to read and write global memory through the shared memory/L1 cache 1416 and the memory partition unit 1300. When configured for general purpose parallel computation, the SM 1400 can also write commands that the scheduler unit 1112 can use to launch new work on the DPC 1206 modules.

The PPU 1100 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 1100 is embodied on a single semiconductor substrate. In another embodiment, the PPU 1100 is included in a system-on-a-chip (SoC) along with one or more other devices such as additional PPU 1100 modules, the memory 1104, a reduced instruction set computer (RISC) CPU, a memory management unit (MMU), a digital-to-analog converter (DAC), and the like.

In an embodiment, the PPU 1100 may be included on a graphics card that includes one or more memory devices 304. The graphics card may be configured to interface with a PCIe slot on a motherboard of a desktop computer. In yet another embodiment, the PPU 1100 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 15:
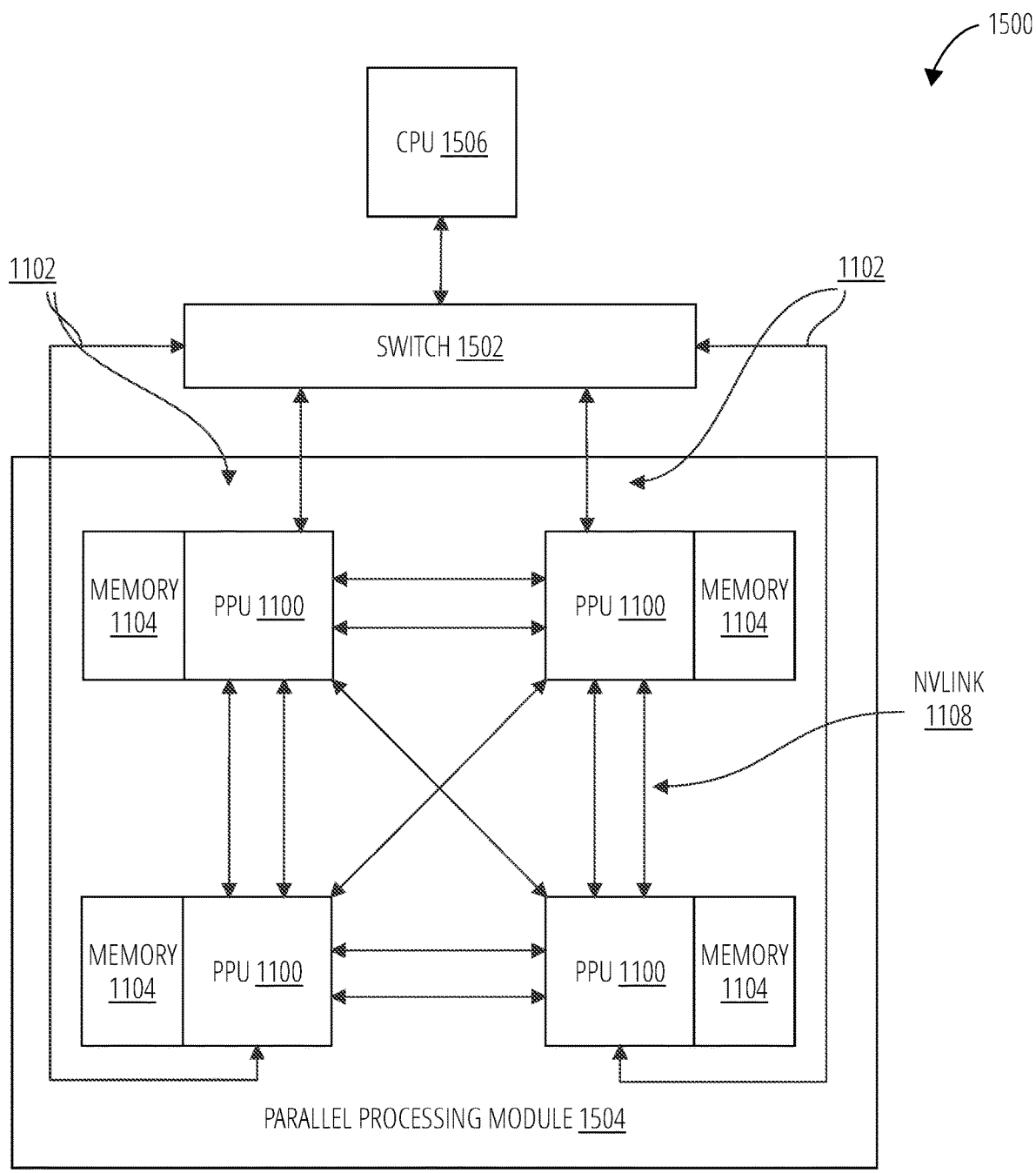
FIG. 15 depicts a processing system 1500 in accordance with one embodiment.

FIG. 15 is a conceptual diagram of a processing system 1500 implemented using the PPU 1100 of FIG. 11, in accordance with an embodiment. The processing system 1500 includes a CPU 1506, switch 1502, and multiple PPU 1100 modules each and respective memory 1104 modules. The NVLink 1108 provides high-speed communication links between each of the PPU 1100 modules. Although a particular number of NVLink 1108 and interconnect 1102 connections are illustrated in FIG. 15, the number of connections to each PPU 1100 and the CPU 1506 may vary. The switch 1502 interfaces between the interconnect 1102 and the CPU 1506. The PPU 1100 modules, memory 1104 modules, and NVLink 1108 connections may be situated on a single semiconductor platform to form a parallel processing module 1504. In an embodiment, the switch 1502 supports two or more protocols to interface between various different connections and/or links.

In another embodiment (not shown), the NVLink 1108 provides one or more high-speed communication links between each of the PPU 1100 modules and the CPU 1506 and the switch 1502 interfaces between the interconnect 1102 and each of the PPU 1100 modules. The PPU 1100 modules, memory 1104 modules, and interconnect 1102 may be situated on a single semiconductor platform to form a parallel processing module 1504. In yet another embodiment (not shown), the interconnect 1102 provides one or more communication links between each of the PPU 1100 modules and the CPU 1506 and the switch 1502 interfaces between each of the PPU 1100 modules using the NVLink 1108 to provide one or more high-speed communication links between the PPU 1100 modules. In another embodiment (not shown), the NVLink 1108 provides one or more high-speed communication links between the PPU 1100 modules and the CPU 1506 through the switch 1502. In yet another embodiment (not shown), the interconnect 1102 provides one or more communication links between each of the PPU 1100 modules directly. One or more of the NVLink 1108 high-speed communication links may be implemented as a physical NVLink interconnect or either an on-chip or on-die interconnect using the same protocol as the NVLink 1108.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 1504 may be implemented as a circuit board substrate and each of the PPU 1100 modules and/or memory 1104 modules may be packaged devices. In an embodiment, the CPU 1506, switch 1502, and the parallel processing module 1504 are situated on a single semiconductor platform.

In an embodiment, the signaling rate of each NVLink 1108 is 20 to 25 Gigabits/second and each PPU 1100 includes six NVLink 1108 interfaces (as shown in FIG. 15, five NVLink 1108 interfaces are included for each PPU 1100). Each NVLink 1108 provides a data transfer rate of 25 Gigabytes/second in each direction, with six links providing 300 Gigabytes/second. The NVLink 1108 can be used exclusively for PPU-to-PPU communication as shown in FIG. 15, or some combination of PPU-to-PPU and PPU-to-CPU, when the CPU 1506 also includes one or more NVLink 1108 interfaces.

In an embodiment, the NVLink 1108 allows direct load/store/atomic access from the CPU 1506 to each PPU 1100 module's memory 1104. In an embodiment, the NVLink 1108 supports coherency operations, allowing data read from the memory 1104 modules to be stored in the cache hierarchy of the CPU 1506, reducing cache access latency for the CPU 1506. In an embodiment, the NVLink 1108 includes support for Address Translation Services (ATS), allowing the PPU 1100 to directly access page tables within the CPU 1506. One or more of the NVLink 1108 may also be configured to operate in a low-power mode.

Figure 16:
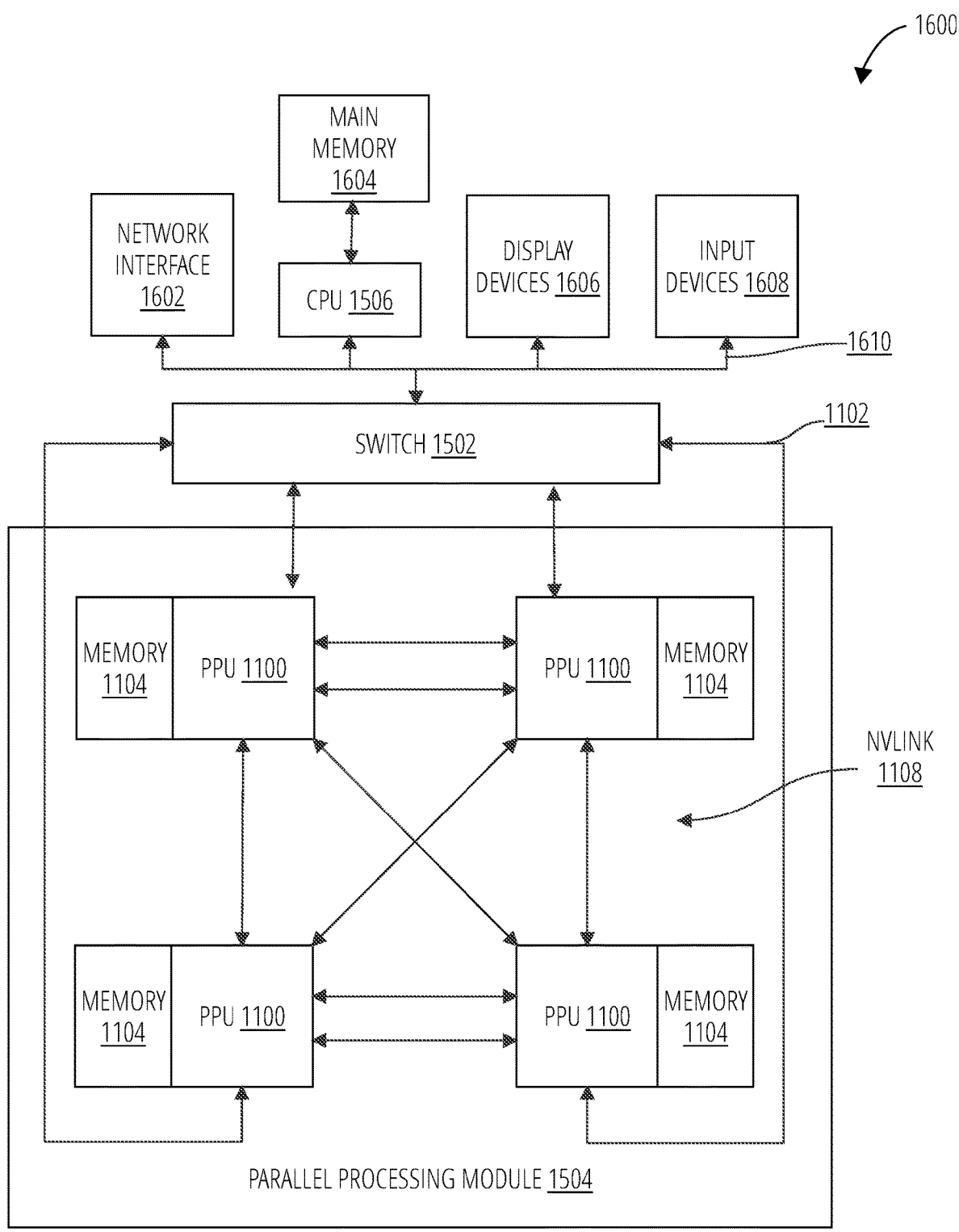
FIG. 16 depicts an exemplary processing system 1600 in accordance with one embodiment.

FIG. 16 depicts an exemplary processing system 1600 in which the various architecture and/or functionality of the various previous embodiments may be implemented. As shown, an exemplary processing system 1600 is provided including at least one CPU 1506 that is connected to a communication communications bus 1610. The communication communications bus 1610 may be implemented using any suitable protocol, such as PCI (Peripheral Component Interconnect), PCI-Express, AGP (Accelerated Graphics Port), HyperTransport, or any other bus or point-to-point communication protocol(s). The exemplary processing system 1600 also includes a main memory 1604. Control logic (software) and data are stored in the main memory 1604 which may take the form of random access memory (RAM).

The exemplary processing system 1600 also includes input devices 1608, the parallel processing module 1504, and display devices 1606, e.g. a conventional CRT (cathode ray tube), LCD (liquid crystal display), LED (light emitting diode), plasma display or the like. User input may be received from the input devices 1608, e.g., keyboard, mouse, touchpad, microphone, and the like. Each of the foregoing modules and/or devices may even be situated on a single semiconductor platform to form the exemplary processing system 1600. Alternately, the various modules may also be situated separately or in various combinations of semiconductor platforms per the desires of the user.

Further, the exemplary processing system 1600 may be coupled to a network (e.g., a telecommunications network, local area network (LAN), wireless network, wide area network (WAN) such as the Internet, peer-to-peer network, cable network, or the like) through a network interface 1602 for communication purposes.

The exemplary processing system 1600 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1604 and/or the secondary storage. Such computer programs, when executed, enable the exemplary processing system 1600 to perform various functions. The main memory 1604, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the exemplary processing system 1600 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

FIG. 16 is a conceptual diagram of a graphics processing pipeline 1700 implemented by the PPU 1100 of FIG. 11, in accordance with an embodiment. In an embodiment, the PPU 1100 comprises a graphics processing unit (GPU). The PPU 1100 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 1100 can be configured to process the graphics primitives to generate a frame buffer (e.g., pixel data for each of the pixels of the display).

An application writes model data for a scene (e.g., a collection of vertices and attributes) to a memory such as a system memory or memory 1104. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SM 1400 modules of the PPU 1100 including one or more of a vertex shader, hull shader, domain shader, geometry shader, and a pixel shader. For example, one or more of the SM 1400 modules may be configured to execute a vertex shader program that processes a number of vertices defined by the model data. In an embodiment, the different SM 1400 modules may be configured to execute different shader programs concurrently. For example, a first subset of SM 1400 modules may be configured to execute a vertex shader program while a second subset of SM 1400 modules may be configured to execute a pixel shader program. The first subset of SM 1400 modules processes vertex data to produce processed vertex data and writes the processed vertex data to the L2 cache 1304 and/or the memory 1104. After the processed vertex data is rasterized (e.g., transformed from three-dimensional data into two-dimensional data in screen space) to produce fragment data, the second subset of SM 1400 modules executes a pixel shader to produce processed fragment data, which is then blended with other processed fragment data and written to the frame buffer in memory 1104. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The graphics processing pipeline 1700 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 1700 receives input data 601 that is transmitted from one stage to the next stage of the graphics processing pipeline 1700 to generate output data 1704. In an embodiment, the graphics processing pipeline 1700 may represent a graphics processing pipeline defined by the OpenGL® API. As an option, the graphics processing pipeline 1700 may be implemented in the context of the functionality and architecture of the previous Figures and/or any subsequent Figure(s).

Figure 17:
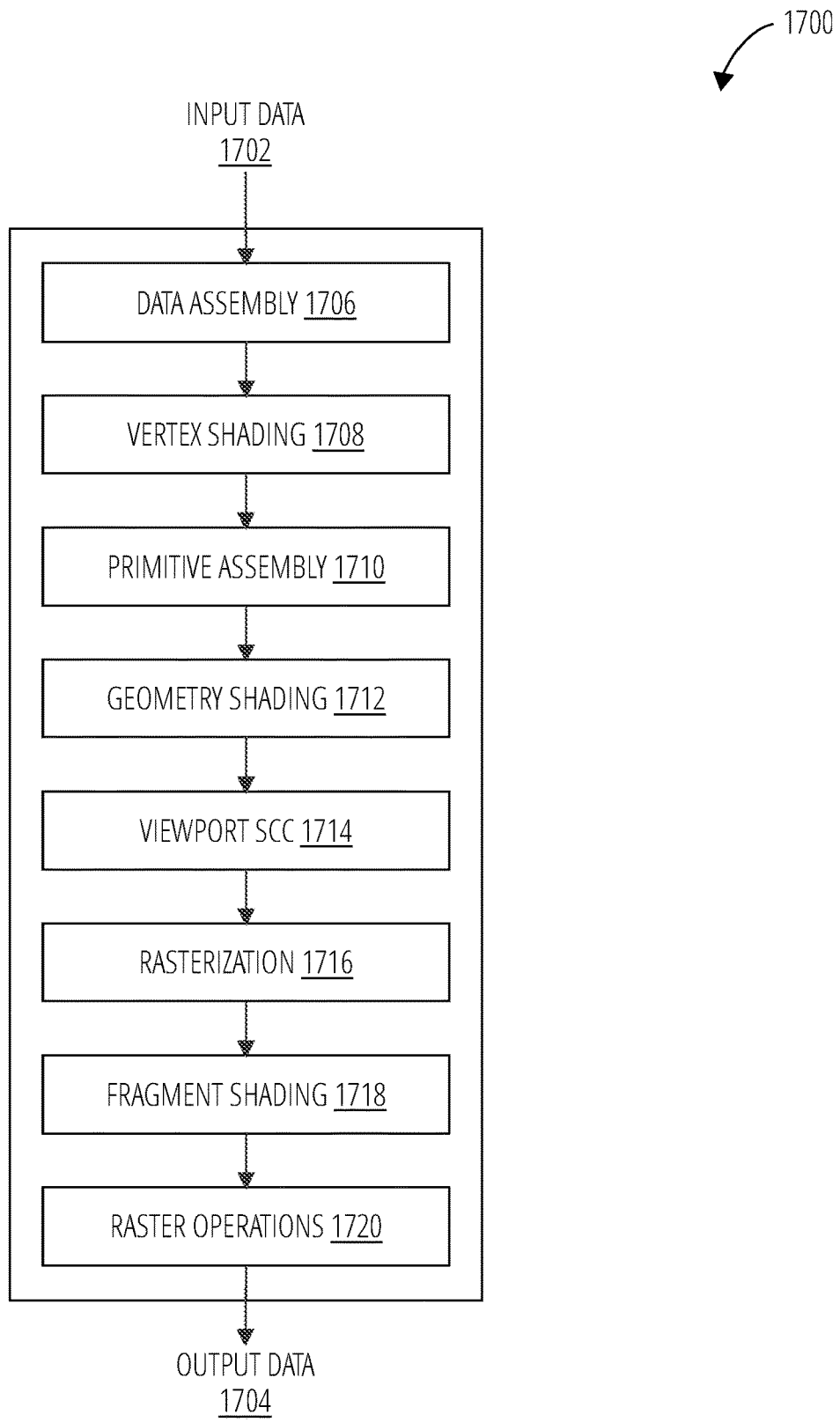
FIG. 17 depicts a graphics processing pipeline 1700 in accordance with one embodiment.

As shown in FIG. 17, the graphics processing pipeline 1700 comprises a pipeline architecture that includes a number of stages. The stages include, but are not limited to, a data assembly 1706 stage, a vertex shading 1708 stage, a primitive assembly 1710 stage, a geometry shading 1712 stage, a viewport SCC 1714 stage, a rasterization 1716 stage, a fragment shading 1718 stage, and a raster operations 1720 stage. In an embodiment, the input data 1702 comprises commands that configure the processing units to implement the stages of the graphics processing pipeline 1700 and geometric primitives (e.g., points, lines, triangles, quads, triangle strips or fans, etc.) to be processed by the stages. The output data 1704 may comprise pixel data (e.g., color data) that is copied into a frame buffer or other type of surface data structure in a memory.

The data assembly 1706 stage receives the input data 1702 that specifies vertex data for high-order surfaces, primitives, or the like. The data assembly 1706 stage collects the vertex data in a temporary storage or queue, such as by receiving a command from the host processor that includes a pointer to a buffer in memory and reading the vertex data from the buffer. The vertex data is then transmitted to the vertex shading 1708 stage for processing.

The vertex shading 1708 stage processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading 1708 stage may manipulate individual vertex attributes such as position, color, texture coordinates, and the like. In other words, the vertex shading 1708 stage performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading 1708 stage generates transformed vertex data that is transmitted to the primitive assembly 1710 stage.

The primitive assembly 1710 stage collects vertices output by the vertex shading 1708 stage and groups the vertices into geometric primitives for processing by the geometry shading 1712 stage. For example, the primitive assembly 1710 stage may be configured to group every three consecutive vertices as a geometric primitive (e.g., a triangle) for transmission to the geometry shading 1712 stage. In some embodiments, specific vertices may be reused for consecutive geometric primitives (e.g., two consecutive triangles in a triangle strip may share two vertices). The primitive assembly 1710 stage transmits geometric primitives (e.g., a collection of associated vertices) to the geometry shading 1712 stage.

The geometry shading 1712 stage processes geometric primitives by performing a set of operations (e.g., a geometry shader or program) on the geometric primitives. Tessellation operations may generate one or more geometric primitives from each geometric primitive. In other words, the geometry shading 1712 stage may subdivide each geometric primitive into a finer mesh of two or more geometric primitives for processing by the rest of the graphics processing pipeline 1700. The geometry shading 1712 stage transmits geometric primitives to the viewport SCC 1714 stage.

In an embodiment, the graphics processing pipeline 1700 may operate within a streaming multiprocessor and the vertex shading 1708 stage, the primitive assembly 1710 stage, the geometry shading 1712 stage, the fragment shading 1718 stage, and/or hardware/software associated therewith, may sequentially perform processing operations. Once the sequential processing operations are complete, in an embodiment, the viewport SCC 1714 stage may utilize the data. In an embodiment, primitive data processed by one or more of the stages in the graphics processing pipeline 1700 may be written to a cache (e.g. L1 cache, a vertex cache, etc.). In this case, in an embodiment, the viewport SCC 1714 stage may access the data in the cache. In an embodiment, the viewport SCC 1714 stage and the rasterization 1716 stage are implemented as fixed function circuitry.

The viewport SCC 1714 stage performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization 1716 stage.

The rasterization 1716 stage converts the 3D geometric primitives into 2D fragments (e.g. capable of being utilized for display, etc.). The rasterization 1716 stage may be configured to utilize the vertices of the geometric primitives to setup a set of plane equations from which various attributes can be interpolated. The rasterization 1716 stage may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization 1716 stage generates fragment data (e.g., interpolated vertex attributes associated with a particular sample location for each covered pixel) that are transmitted to the fragment shading 1718 stage.

The fragment shading 1718 stage processes fragment data by performing a set of operations (e.g., a fragment shader or a program) on each of the fragments. The fragment shading 1718 stage may generate pixel data (e.g., color values) for the fragment such as by performing lighting operations or sampling texture maps using interpolated texture coordinates for the fragment. The fragment shading 1718 stage generates pixel data that is transmitted to the raster operations 1720 stage.

The raster operations 1720 stage may perform various operations on the pixel data such as performing alpha tests, stencil tests, and blending the pixel data with other pixel data corresponding to other fragments associated with the pixel. When the raster operations 1720 stage has finished processing the pixel data (e.g., the output data 1704), the pixel data may be written to a render target such as a frame buffer, a color buffer, or the like.

It will be appreciated that one or more additional stages may be included in the graphics processing pipeline 1700 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading 1712 stage). Other types of graphics processing pipelines are contemplated as being within the scope of the present disclosure. Furthermore, any of the stages of the graphics processing pipeline 1700 may be implemented by one or more dedicated hardware units within a graphics processor such as PPU 1100. Other stages of the graphics processing pipeline 1700 may be implemented by programmable hardware units such as the SM 1400 of the PPU 1100.

The graphics processing pipeline 1700 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 1100. The API provides an abstraction for a programmer that lets a programmer utilize specialized graphics hardware, such as the PPU 1100, to generate the graphical data without requiring the programmer to utilize the specific instruction set for the PPU 1100. The application may include an API call that is routed to the device driver for the PPU 1100. The device driver interprets the API call and performs various operations to respond to the API call. In some instances, the device driver may perform operations by executing instructions on the CPU. In other instances, the device driver may perform operations, at least in part, by launching operations on the PPU 1100 utilizing an input/output interface between the CPU and the PPU 1100. In an embodiment, the device driver is configured to implement the graphics processing pipeline 1700 utilizing the hardware of the PPU 1100.

Various programs may be executed within the PPU 1100 in order to implement the various stages of the graphics processing pipeline 1700. For example, the device driver may launch a kernel on the PPU 1100 to perform the vertex shading 1708 stage on one SM 1400 (or multiple SM 1400 modules). The device driver (or the initial kernel executed by the PPU 1100) may also launch other kernels on the PPU 1100 to perform other stages of the graphics processing pipeline 1700, such as the geometry shading 1712 stage and the fragment shading 1718 stage. In addition, some of the stages of the graphics processing pipeline 1700 may be implemented on fixed unit hardware such as a rasterizer or a data assembler implemented within the PPU 1100. It will be appreciated that results from one kernel may be processed by one or more intervening fixed function hardware units before being processed by a subsequent kernel on an SM 1400.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

What is claimed is:

1. A memory system comprising:
   a first memory comprising a plurality of operative memory slices;
   a second memory comprising a plurality of memory channels;
   a number of operative memory slices and a number of the memory channels being not evenly divisible;
   address mapping logic to map an address directed to the first memory to one of the plurality of operative memory slices; and
   routing logic utilizing one or more lookup tables to evenly map addresses in the first memory to addresses in the second memory wherein at least one of the operative memory slices is shared by a plurality of the memory channels.

2. The memory system of claim 1, the routing logic utilizing a shared queue between the memory channels and the operative memory slices.

3. The memory system of claim 1, the address mapping logic mapping the virtual address space linearly and monotonically within each of the operative memory slices.

4. The memory system of claim 1, comprising exactly three operative memory slices.

5. The memory system of claim 1, comprising exactly five operative memory slices.

6. The memory system of claim 1, the address mapping logic utilizing bits of the address directed to the first memory to select both a set and a slice of the first memory from the one or more lookup tables.

7. A graphics processing unit comprising:
- a last level cache comprising a first number N of operative memory slices;
- a plurality of M memory channel controllers;
- address mapping logic; and
- collision resolution logic comprising one or more shared queues between at least one shared memory slice of the operative memory slices and the memory channel controllers.

8. The graphics processing unit of claim 7, wherein the address mapping logic presents a linear and monotonically increasing address space to clients of the last level cache.

9. The graphics processing unit of claim 7, wherein N and M are not evenly divisible.

10. The graphics processing unit of claim 7, comprising exactly three operative memory slices.

11. The graphics processing unit of claim 7, comprising exactly five operative memory slices.

12. The graphics processing unit of claim 7, the collision resolution logic comprising a plurality of multi-ported queues, wherein a first port of one or more of the multi-ported queues is directed to a dedicated memory slice of the operative memory slices and a second port of each of the multi-ported queues is directed to the at least one shared memory slice.

13. The graphics processing unit of claim 7, the address mapping logic utilizing bits of an address directed to the last level cache to select both a set and a slice of the last level cache from at least one lookup table.

14. A method of operating a memory system, the method comprising:
- transforming an address from a memory client to a physical address in one of a plurality of N operative memory slices of an on-chip memory, the address from an address space interleaved across the operative memory slices of the on-chip memory and at least one inoperative memory slice of the on-chip memory; and
- evenly balancing an address map between a plurality of M memory channels to an off-chip memory to a memory slice of the operative memory slices shared by a plurality of the memory channels, wherein N and M are not evenly divisible.

15. The method of claim 14, further comprising balancing the address map utilizing at least one FIFO shared by the plurality of the memory channels.

16. The method of claim 14, wherein transforming the address space is linear and monotonic.

17. The method of claim 14, wherein N=3.

18. The method of claim 14, wherein N=5.

19. The method of claim 14, comprising at least one multi-ported queue, wherein a first port of the multi-ported queue is directed to a dedicated memory slice of the operative memory slices and a second port of each of the multi-ported queues is directed to the shared memory slice.

20. The method of claim 14, further comprising:
- utilizing bits of the address from the memory client to select both a set and a slice of the last level cache from one or more lookup tables.

* * * * *